US008909400B2

(12) United States Patent
Sato et al.

(10) Patent No.: US 8,909,400 B2
(45) Date of Patent: Dec. 9, 2014

(54) CONTROL APPARATUS FOR VEHICULAR POWER TRANSMITTING SYSTEM

(75) Inventors: Daiki Sato, Toyota (JP); Taiyo Uejima, Toyota (JP); Kazuyuki Shiiba, Toyota (JP); Norihiro Yamamura, Aichi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 89 days.

(21) Appl. No.: 13/532,215

(22) Filed: Jun. 25, 2012

(65) Prior Publication Data
US 2012/0310460 A1 Dec. 6, 2012

Related U.S. Application Data

(63) Continuation-in-part of application No. PCT/JP2009/071704, filed on Dec. 26, 2009.

(51) Int. Cl.
*B60L 9/00* (2006.01)
*B60L 11/00* (2006.01)
*G05D 1/00* (2006.01)
*G06F 17/00* (2006.01)
*G06F 7/00* (2006.01)
*B60L 3/00* (2006.01)
*B60K 6/445* (2007.10)
*B60W 10/115* (2012.01)
*B60W 10/08* (2006.01)
*B60L 11/14* (2006.01)
*B60W 30/19* (2012.01)
*B60L 15/20* (2006.01)
*B60W 20/00* (2006.01)

(52) U.S. Cl.
CPC .................. *B60L 11/14* (2013.01); *B60L 3/003* (2013.01); *Y02T 10/642* (2013.01); *Y02T 10/6239* (2013.01); *B60K 6/445* (2013.01); *B60W 10/115* (2013.01); *B60W 10/08* (2013.01); *B60W 30/19* (2013.01); *B60L 2240/423* (2013.01); *B60W 20/00* (2013.01); *Y02T 10/7077* (2013.01); *B60L 2240/527* (2013.01); *B60L 15/2054* (2013.01); *Y10S 903/903* (2013.01)
USPC .................. 701/22; 707/87; 707/51; 707/84; 180/65.235; 180/65.285; 903/903

(58) Field of Classification Search
CPC ... B60L 2240/423; B60L 11/02; B60L 15/20; B60L 1/00; B60L 10/10; B60W 10/08; B60W 20/00; B60W 2710/081; B60W 2710/1005; B60K 6/547; B60K 6/20; B60K 1/02; B60K 6/40; B60K 6/00; B60K 28/16
USPC .................. 701/22, 99, 29, 87, 51, 82, 84; 180/65.285, 65.275, 65.2, 65.235, 180/65.265, 65.21; 318/400.3, 561, 400.26, 318/453; 903/903, 930, 907, 909
See application file for complete search history.

(56) References Cited

U.S. PATENT DOCUMENTS 5,951,614 A 9/1999 Tabata et al.
6,026,921 A * 2/2000 Aoyama et al. ............ 180/65.25
(Continued)

FOREIGN PATENT DOCUMENTS

DE 103 01 531 8/2004
DE 10 2004 046 194 6/2005
(Continued)

OTHER PUBLICATIONS

International Search Report in International Application No. PCT/JP2009/071704; Mailing Date: Feb. 2, 2010.

*Primary Examiner* — Calvin Cheung
*Assistant Examiner* — Luis A Martinez Borrero
(74) *Attorney, Agent, or Firm* — Finnegan, Henderson, Farabow, Garrett & Dunner, LLP

(57) ABSTRACT

It is provided a control apparatus for a vehicle provided with an electric motor power source, an inverter, an electric motor, an inverter smoothing capacitor, and a step-variable automatic transmission, the control apparatus being configured to implement a torque reduction control, and to implement a torque reduction limitation control to limit reduction of an output torque of the electric motor to within a range in which a terminal voltage of the inverter smoothing capacitor will not exceed a predetermined withstanding voltage of the inverter and to limit the reduction of the output torque by limiting an amount of change of the output torque per unit time during the reduction of the output torque in the torque reduction control, to within a predetermined torque reduction rate limiting range, and wherein the torque reduction rate limiting range is determined upon initiation of a shifting action of the automatic transmission.

3 Claims, 10 Drawing Sheets

(56) References Cited

U.S. PATENT DOCUMENTS

| | | | |
|---|---|---|---|
| 7,426,973 B2 * | 9/2008 | Matsubara et al. | 180/65.25 |
| 7,546,186 B2 * | 6/2009 | Yang | 701/22 |
| 7,584,813 B2 * | 9/2009 | Yoshida | 180/65.29 |
| 2001/0020789 A1 * | 9/2001 | Nakashima | 290/40 C |
| 2003/0230443 A1 * | 12/2003 | Cramer et al. | 180/65.5 |
| 2004/0163860 A1 * | 8/2004 | Matsuzaki et al. | 180/65.2 |
| 2004/0195017 A1 | 10/2004 | Braun et al. | |
| 2005/0103544 A1 | 5/2005 | Takami et al. | |
| 2007/0158121 A1 | 7/2007 | Sato | |
| 2008/0018111 A1 * | 1/2008 | Yaguchi | 290/40 B |
| 2008/0067965 A1 * | 3/2008 | Bailey et al. | 318/561 |
| 2008/0115985 A1 * | 5/2008 | Ishikawa et al. | 180/65.2 |
| 2008/0234914 A1 * | 9/2008 | Tabata et al. | 701/99 |
| 2009/0137361 A1 | 5/2009 | Matsubara et al. | |
| 2009/0171523 A1 * | 7/2009 | Luo et al. | 701/22 |
| 2009/0209381 A1 * | 8/2009 | Ai et al. | 475/5 |
| 2009/0250278 A1 * | 10/2009 | Kawasaki et al. | 180/65.275 |
| 2009/0299559 A1 * | 12/2009 | Shimohira et al. | 701/22 |
| 2009/0305832 A1 * | 12/2009 | Matsubara et al. | 475/150 |
| 2009/0314565 A1 * | 12/2009 | Suzuki | 180/65.285 |
| 2010/0097018 A1 * | 4/2010 | Itoh et al. | 318/400.3 |
| 2010/0102767 A1 * | 4/2010 | Endo et al. | 318/453 |
| 2010/0204862 A1 * | 8/2010 | Uejima et al. | 701/22 |
| 2011/0270483 A1 * | 11/2011 | Endo et al. | 701/29 |
| 2011/0288709 A1 * | 11/2011 | Maass | 701/22 |
| 2012/0056569 A1 * | 3/2012 | Takamatsu et al. | 318/400.26 |
| 2012/0077638 A1 * | 3/2012 | Kumazaki et al. | 477/5 |

FOREIGN PATENT DOCUMENTS

| | | |
|---|---|---|
| DE | 11 2006 002 865 | 9/2008 |
| JP | 6-319210 | 11/1994 |
| JP | 9-331602 | 12/1997 |
| JP | 3373459 | 11/2002 |
| JP | 3380728 | 12/2002 |
| JP | 2004-129494 | 4/2004 |
| JP | 2007-221894 | 8/2007 |
| JP | 2009-190442 | 8/2009 |
| WO | WO 2006/095497 | 9/2006 |

\* cited by examiner

|  | B1 | B2 |
|---|---|---|
| LOW-SPEED POSITION Lo (FIRST-SPEED POSITION) | × | ○ |
| HIGH-SPEED POSITION Hi (SECOND-SPEED POSITION) | ○ | × |

○ : ENGAGING OF BRAKE
× : RELEASING OF BRAKE

FIG.7

| SECOND ELECTRIC MOTOR SPEED Nmg2 [rpm] | 2000 | 4000 | 6000 | 8000 | 10000 |
|---|---|---|---|---|---|
| TORQUE REDUCTION RATE THRESHOLD VALUE $\Delta TL$ [Nm/sec] | -20000 | -10000 | -6664 | -5000 | -4000 |

FIG.8

| SMOOTHING CAPACITOR VOLTAGE Vcon [V] | 800 | 825 | 850 | 875 | 900 |
|---|---|---|---|---|---|
| TORQUE REDUCTION RATE THRESHOLD VALUE $\Delta TL$ [Nm/sec] | -20000 | -11260 | -5000 | -1260 | 0 |

US 8,909,400 B2

CONTROL APPARATUS FOR VEHICULAR POWER TRANSMITTING SYSTEM

CROSS-REFERENCE TO RELATED APPLICATIONS

This application is a Continuation-in-Part of International Application No. PCT/JP2009/071704, filed Dec. 26, 2009, the content of which is incorporated herein by reference.

TECHNICAL FIELD

The present invention relates to techniques for controlling an output torque of an electric motor provided on a vehicle as a drive power source.

BACKGROUND ART

There is well known a vehicular power transmitting system provided with an electric motor as a drive power source, and an automatic transmission constituting a part of a power transmitting path between the electric motor and drive wheels, as commonly seen in a hybrid vehicle or an electric vehicle. Patent Document 1 discloses an example of such a vehicular power transmitting system.

A control apparatus for the vehicular power transmitting system disclosed in the Patent Document 1 is configured to implement a torque reduction control of the above-indicated electric motor to temporarily reduce its output torque (electric motor torque) during a shifting action of the above-indicated automatic transmission, with respect to the output torque before the shifting action. This torque reduction control is intended to reduce a shifting shock of the above-indicated automatic transmission caused by its shifting operation, and to reduce an amount of absorption of heat by friction members of the automatic transmission.

The vehicular power transmitting system as disclosed in the above-identified Patent Document 1 is usually arranged such that an inverter is connected to the above-indicated electric motor, while a smoothing capacitor or condenser is connected to an electric power source side of the inverter, for smoothing an input voltage of the inverter. However, this arrangement is not clearly described in the document.

PRIOR ART DOCUMENTS

Patent Documents

Patent Document 1: JP-6-319210 A
Patent Document 2: JP-2004-129494 A
Patent Document 3: JP-3380728 B
Patent Document 4: JP-3373459 B

SUMMARY OF THE INVENTION

Object Achieved by the Invention

In the process of the above-described torque reduction control, the electric motor torque is abruptly reduced during the shifting operation of the above-indicated automatic transmission, so that the amount of reduction of the output of the above-indicated electric motor (electric motor output) per unit time (electric motor output reduction ratio) is extremely increased due to the abrupt reduction of the electric motor torque. In addition, the operating speed of the above-indicated electric motor (electric motor speed) is reduced during a shift-up operation of the automatic transmission, and this reduction of the electric motor speed results in a further increase of the above-described electric motor output reduction ratio.

An extreme increase of the above-described electric motor output reduction ratio may cause a failure of an electric power output circuit provided to supply electric power to the above-indicated inverter for the electric motor, to reduce its output following an output reduction of the electric motor, even when the extreme increase of the electric motor output reduction ratio takes place temporarily. Namely, the amount of electric power supply from the electric power source may exceed the amount of consumption of the electric power by the electric motor, so that a surplus of the electric power is temporarily stored in the above-indicated smoothing capacitor. Accordingly, in the control apparatus for the vehicular power transmitting system described in Patent Document 1, the above-indicated smoothing capacitor is required to have an electrostatic capacitor large enough to accommodate the above-described surplus electric power temporarily generated due to the above-described torque reduction control to prevent shortage of capacity. For this reason, it has been difficult to reduce the size and cost of an electric circuit including the smoothing capacitor. In this respect, it is noted that the problem described above is not recognized in the art.

The present invention was made in view of the background art described above. It is therefore an object of the present invention to provide a control apparatus for a vehicle, which is configured to implement the above-described torque reduction control during a shifting action of the above-indicated automatic transmission and which permits reduction of the size and cost of the electric circuit including the above-indicated smoothing capacitor.

Means for Achieving the Object

The object indicated above is achieved according to the first aspect of the invention, which provides (a) a control apparatus for a vehicle provided with an electric motor power source, an inverter, an electric motor connected through the above-described inverter to the above-described electric motor power source, an inverter smoothing capacitor connected to a terminal of the above-described inverter on the side of the above-described electric motor power source to smooth a voltage input from the above-described electric motor power source to the inverter, and a step-variable automatic transmission constituting a part of a power transmitting path between the above-described electric motor and a drive wheel, the control apparatus being configured to implement a torque reduction control to temporarily reduce an output torque of the above-described electric motor during a shifting action of the above-described automatic transmission, with respect to an output torque of the electric motor before initiation of the shifting action, and (b) being characterized in that the above-described control apparatus is configured to implement a torque reduction limitation control to limit reduction of the output torque of the above-described electric motor to within a range in which a terminal voltage of the above-described inverter smoothing capacitor which rises in relation to reduction of the output torque of the above-descried electric motor in the above-described torque reduction control will not exceed a predetermined withstanding voltage of the above-described inverter, and wherein (c) the above-described torque reduction limitation control is implemented to limit the reduction of the output torque of the above-described electric motor by limiting an amount of change of the output torque of the above-described electric motor per unit time during the reduction of the output torque of the above-described electric motor in the above-described torque reduction control, to within a predetermined torque reduction rate limiting range in which the terminal voltage of the above-described inverter smoothing capacitor will not exceed the above-described predetermined withstanding voltage, and (d) the above-described torque reduction rate limiting range is determined upon initiation of the shifting action of the above-described automatic transmission.

Advantages of the Invention

According to the present invention, the abrupt reduction of the output torque of the electric motor (electric motor torque) in the above-described torque reduction control is more or less limited, so that the electrostatic capacity of the inverter smoothing capacitor need not be designed so as to deal with unlimited abrupt reduction of the electric motor torque in the above-described torque reduction control, whereby the electrostatic capacity of the above-described inverter smoothing capacitor can be designed to be smaller than where the abrupt reduction of the above-indicated electric motor torque is not limited. Namely, it is possible to reduce the size and cost of a electric circuit including the above-described inverter smoothing capacitor, since the size and cost of the above-described inverter smoothing capacitor tend to be reduced with a decrease of the above-described electrostatic capacity of the above-described inverter smoothing capacitor.

The above-described torque reduction limitation control is implemented to limit the reduction of the output torque of the above-described electric motor by holding an amount of change of the output torque of the above-described electric motor per unit time during the reduction of the output torque of the above-described electric motor in the above-described torque reduction control, within a predetermined torque reduction rate limiting range in which the terminal voltage of the above-described inverter smoothing capacitor will not exceed the above-described predetermined withstanding voltage. In this form of the invention, it is possible to prevent the terminal voltage of the inverter smoothing capacitor from exceeding the above-described withstanding voltage, by monitoring the above-described electric motor torque, so that the reduction of the above-described electric motor torque can be easily limited in the above-described torque reduction limitation control.

According to a preferred form of the invention, the above-described torque reduction rate limiting range is determined and updated from time to time on the basis of the terminal voltage of the above-described inverter smoothing capacitor. In this form of the invention, the degree of limitation of the abrupt reduction of the above-described electric motor torque is changed according to the terminal voltage of the above-described inverter smoothing capacitor which changes with a lapse of time, so that the torque reduction control ensures a high degree of vehicle drivability according to the above-indicated terminal voltage.

According to a further preferred form of the invention, the above-described torque reduction rate limiting range is determined and updated from time to time on the basis of an amount of change of an output of the above-described electric motor per unit time due to a change of a speed of the electric motor, and the speed of the electric motor. In this form of the invention, the vehicle drivability can be further improved, since a change of the output of the above-described electric motor output due to a change of the speed of the electric motor (electric motor speed) is also taken into account.

According to still another preferred form of the invention, the above-described torque reduction rate limiting range is a predetermined fixed range. In this form of the invention, the above-described torque reduction rate limiting range need not be determined from time to time, so that the above-described torque reduction limitation control can be easily implemented.

According to a still further preferred form of the invention, (a) the above-described automatic transmission is shifted by a releasing action of a releasing side coupling device and an engaging action of an engaging side coupling device, (b) the above-described shifting action of the above-described automatic transmission during which the above-described torque reduction control is implemented is a shift-up action, and (c) a rate of rise of an engaging force of the above-described engaging side coupling device is reduced when the above-described torque reduction limitation control is insufficient to prevent the terminal voltage of the above-described inverter smoothing capacitor from exceeding the above-described withstanding voltage, with respect to a rate of rise of the engaging force when the torque reduction limitation control is sufficient. In this form of the invention, a rate of reduction of the electric motor output due to reduction of the electric motor speed is reduced by reducing the rate of rise of the engaging force of the engaging side coupling device, making it possible to prevent abrupt reduction of the electric motor output caused by the reduction of the electric motor speed, thereby making it possible to more stably prevent the terminal voltage of the above-described inverter smoothing capacitor from exceeding the withstanding voltage of the above-described inverter.

BRIEF DESCRIPTION OF THE DRAWINGS

FIG. 7 is a table indicating an example of a map for determining a torque reduction rate limit value (torque reduction rate threshold value) on the basis of an operating speed of the second electric motor used as a parameter during a torque reduction limiting control implemented by a torque reduction limitation control means 94 of FIG. 4;

FIG. 8 is a table indicating an example of a map for determining the torque reduction rate limit value (torque reduction rate threshold value) on the basis of a voltage of a smoothing capacitor used as a parameter during the torque reduction limiting control implemented by the torque reduction limitation control means 94 of FIG. 4;

MODE FOR CARRYING OUT THE INVENTION

Figure 1:
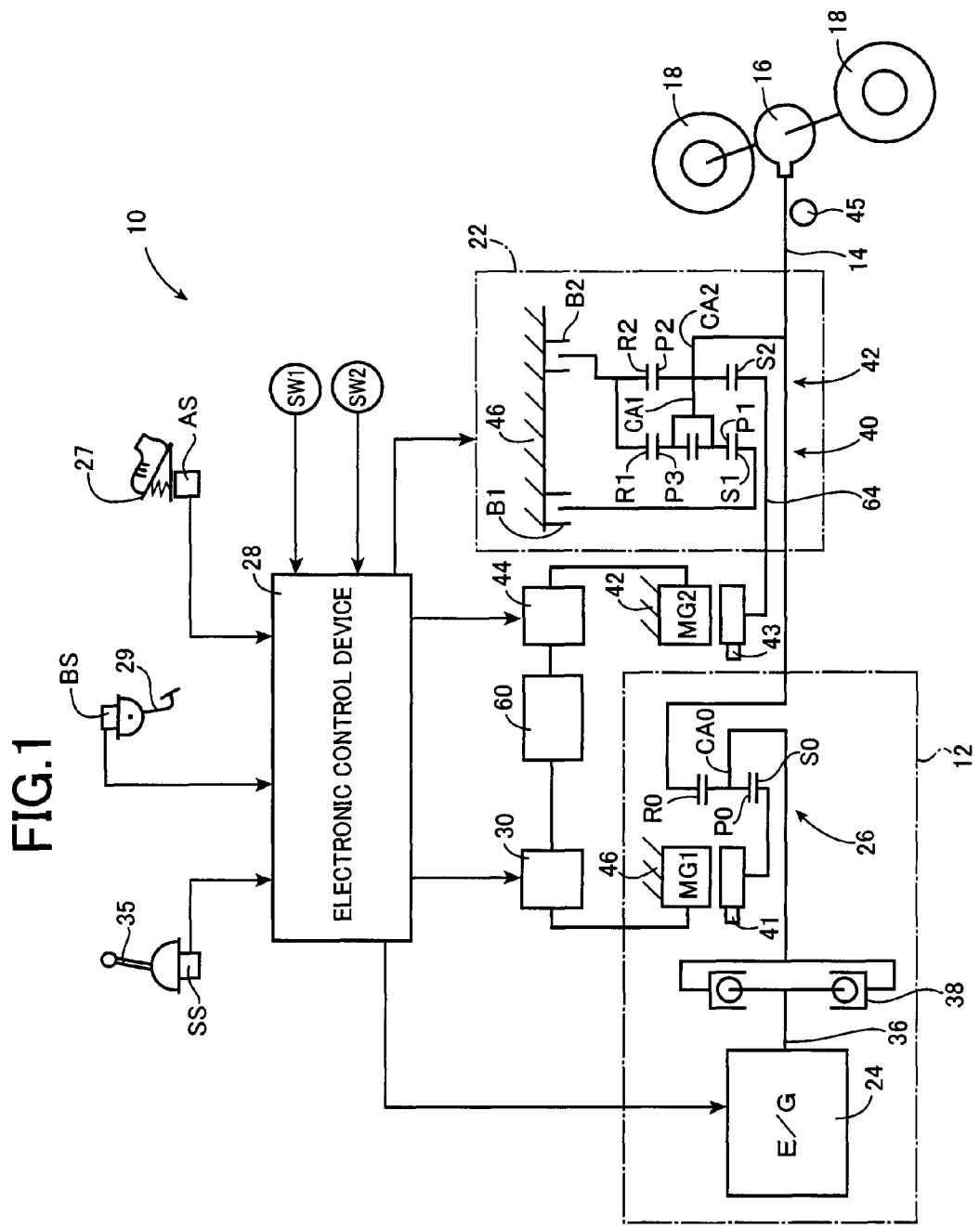
FIG. 1 is a schematic view for explaining a vehicular power transmitting system to which the present invention is applicable.

Embodiments of the present invention will be described in detail by reference to the drawings.
Embodiments FIG. 1 is the schematic view for explaining a power transmitting system 10 of a hybrid vehicle (hereinafter referred to as "vehicular power transmitting system 10") to which the present invention is applicable. As shown in FIG. 1, the vehicular power transmitting system 10 is provided with a main drive power source in the form of a first drive power source 12, a drive wheel-side output shaft 14 functioning as an output member (hereinafter referred to as "output shaft 14"), a differential gear device 16, a second electric motor MG2, and an automatic transmission 22. In the vehicular power transmitting system 10, a torque of the first drive power source 12 is transmitted to the output shaft 14, and is then transmitted from the output shaft 14 to a pair of right and left drive wheels 18 through the differential gear device 16. Further, the vehicular power transmitting system 10 is configured such that the second electric motor MG2 is operatively connected to the output shaft 14 through the automatic transmission 22, so that the second electric motor MG2 is operable to selectively implement a forward drive control for producing a vehicle drive force for running the vehicle, or a regenerative control for recovering an energy. Thus, the output torque transmitted from the second electric motor MG2 to the output shaft 14 is increased or reduced according to a speed ratio γs (=operating speed Nmg2 of the second electric motor MG2/rotating speed Nout of the output shaft 14) of the automatic transmission 22.

The automatic transmission 22 which constitutes a part of a power transmitting path between the second electric motor MG2 (equivalent to an electric motor according to the present invention) and the output shaft 14 (drive wheels 18) is constructed to have a plurality of operating positions the speed ratios γs of which are higher than "1". When the second electric motor MG2 is operable to produce a forward drive torque for running the vehicle, the automatic transmission 22 is operated to increase the forward drive torque received from the second electric motor MG2, so that the increased forward drive torque is transmitted to the output shaft 14. Accordingly, the required capacity and size of the second electric motor MG2 can be further reduced. The automatic transmission 22 is placed in the operating position having the relatively low speed ratio γs to reduce the operating speed Nmg2 of the second electric motor MG2 (hereinafter referred to as "second electric motor speed") when the rotating speed Nout of the output shaft 14 (hereinafter referred to as "output shaft speed Nout") is increased with an increase of the vehicle speed, and is placed in the operating position having the relatively high speed ratio γs to increase the second electric motor speed Nmg2 when the output shaft speed Nout is reduced.

The above-described first drive power source 12 is primarily constituted by a main power source in the form of an engine 24, a first electric motor MG1, and a power distributing mechanism (differential mechanism) in the form of a planetary gear set 26 operable to synthesize or distribute the torque between the engine 24 and the first electric motor MG1. The above-described engine 24 is a known internal combustion engine such as a gasoline or diesel engine operable to produce a drive force by combustion of a fuel. Operating conditions of the engine 24 such as an angle of opening of a throttle valve, an intake air quantity, a fuel supply amount and an ignition timing are electrically controlled by an electronic control device 28 which is principally constituted by a microcomputer and which functions as an engine control device (E-ECU).

The above-described first electric motor MG1 is a synchronous electric motor, for instance, and selectively functions as an electric motor for generating a drive torque, or an electric generator. The first electric motor MG1 is connected to an electric-energy storage device 32 (shown in FIG. 4) through a first inverter 30. The above-described electronic control device 28 also functions as a motor generator control device (MG-ECU) for controlling the first inverter 30 so as to adjust or set the output torque or regenerative torque of the first electric motor MG1.

The above-described planetary gear set 26 is a planetary gear mechanism of a single-pinion type which is operable to perform a known differential operation and which has three rotary elements consisting of: a sun gear S0: a ring gear R0 disposed concentrically with the sun gear S0: and a carrier CA0 which supports a pinion gear P0 meshing with the sun gear S0 and ring gear R0, such that the pinion gear P0 is freely rotatable about its axis and about the axis of the planetary gear set. The planetary gear set 26 is disposed coaxially with the engine 24 and the automatic transmission 22. It is noted that lower halves of the planetary gear set 26 and automatic transmission 22 are not shown in FIG. 1, since each of the planetary gear set 26 and automatic transmission 22 is symmetric with respect to its centerline.

In the present embodiment, a crankshaft 36 of the engine 24 is connected to the carrier CA0 of the planetary gear set 26 through a damper 38. On the other hand, the first electric motor MG1 is connected to the sun gear S0, while the output shaft 14 is connected to the ring gear R0. The carrier CA0 functions as an input element, and the sun gear S0 functions as a reaction element, while the ring gear R0 functions as an output element.

Figures 2, 3:
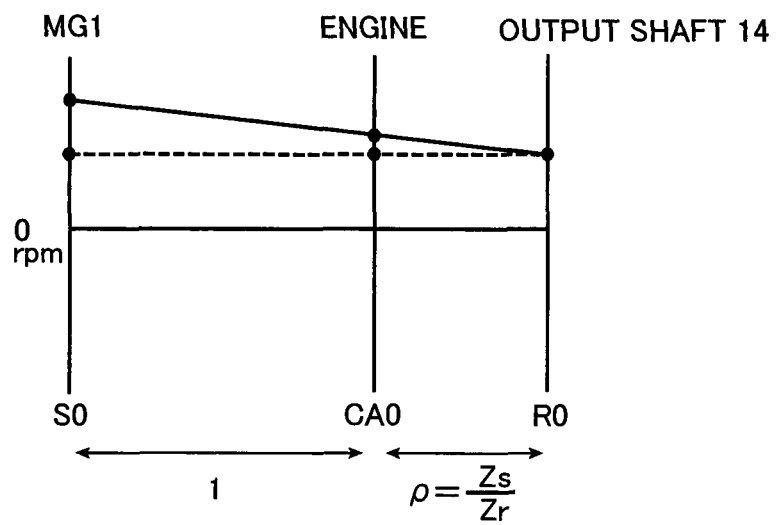
FIG. 2 is a collinear chart indicating relative rotating speeds of rotary elements of a planetary gear set functioning as a power distributing mechanism in the vehicular power transmitting system of FIG. 1.
FIG. 3 is a table indicating engaging actions of coupling devices of an automatic transmission provided in the vehicular power transmitting system of FIG. 1.

Relative rotating speeds of the rotary elements of the single-pinion type planetary gear set 26 functioning as the differential mechanism are indicated in the collinear chart of FIG. 2. In this collinear chart, vertical axes S0, CA0 and R0 respectively indicate the rotating speeds of the sun gear S0, carrier CA0 and ring gear R0, and distances between the vertical axis CA0 and the vertical axes S0 and R0 are determined such that the distance between the vertical axes CA0 and R0 is equal to ρ (number Zs of teeth of the sun gear S0/number Zr of teeth of the ring gear R0) when the distance between the vertical axes S0 and CA0 is equal to "1".

In the above-described planetary gear set 26, the first electric motor MG1 functions as the electric generator when the output torque of the engine 24 is input to the carrier CA0, and the reaction torque of the first electric motor MG1 is input to the sun gear S0, while the ring gear R0 functioning as the output element transmits the output torque. The operating speed Ne of the engine 24 (hereinafter referred to as "engine speed Ne") is continuously variable, that is, variable without a stepping change, by increasing and reducing the operating speed Nmg1 of the first electric motor MG1 (hereinafter referred to as "first electric motor speed Nmg1") while the rotating speed of the ring gear R0, that is, the output shaft speed Nout is held constant. A broken line in FIG. 2 indicates a decrease of the engine speed Ne when the first electric motor speed Nmg1 is reduced from a value indicated by a solid line. Namely, the engine speed Ne can be controlled so as to maximize the fuel economy, by controlling the first electric motor MG1. This type of hybrid control is called a mechanical distribution type or split type. As described above, the differential state of the planetary gear set 26 is electrically controlled by the first electric motor MG1.

Referring back to FIG. 1, the automatic transmission 22 is provided with a planetary gear set 40 of a double-pinion type, and a planetary gear set 42 of a single-pinion type. The planetary gear set 40 has three rotary elements consisting of: a sun gear S1; a ring gear R1 disposed concentrically with the sun gear S1: and a carrier CA1 which supports a pinion gear P1 meshing with the sun gear S1 and a pinion gear P3 meshing with the ring gear R1, such that the pinion gears P1 and P3 mesh with each other and are freely rotatable about their respective axes and about the axis of the planetary gear set. The planetary gear set 42 has three elements consisting of: a sun gear S2; a ring gear R2 disposed concentrically with the sun gear S2: and a carrier CA2 which supports a pinion gear P2 meshing with the sun gear S2 and ring gear R2, such that the pinion gear P2 is freely rotatable about its axis and about the axis of the planetary gear set.

The above-described second electric motor MG2 is controlled through a second inverter 44 by the electronic control device 28 which also functions as a motor generator control device (MG-ECU), such that the second electric motor MG2 is operable as an electric motor or an electric generator, so as to adjust or set an assisting torque or a regenerative torque. The second electric motor MG2 is connected to the above-described sun gear S2, while the above-described carriers CA1 and CA2 are integrally fixed to each other and connected to the output shaft 14.

The automatic transmission 22 is provided with: a first brake B1 which is disposed between the sun gear S1 and a stationary member in the form of a housing 46 and which is operable to selectively fix the sun gear S1 to the housing 46; and a second brake B2 which is disposed between the housing 46 and the ring gears R1 and R2 integrally fixed to each other and which is operable to selectively fix the ring gears R1, R2 to the housing 46. These brakes B1 and B2 are so-called frictional coupling devices which are configured to generate a braking force by friction and which may be of a multiple-disc type or a band type. The brakes B1, B2 are respectively actuated by respective hydraulic cylinders in the form of a brake B1 hydraulic actuator and a brake B2 hydraulic actuator, such that the torque capacities of the brakes B1, B2 are continuously variable according to engaging hydraulic pressures of the brake B1 actuator and brake B2 actuator.

In the automatic transmission 22 constructed as described above, the sun gear S2 functions as an input element while the carriers CA1 and CA2 function as an output element. As indicated in the table of FIG. 3, the automatic transmission 22 is placed in its high-speed position Hi the speed ratio γsh of which is higher than "1" when the first brake B1 is placed in its engaged state while the second brake B2 is placed in its released state, and is placed in its low-speed position Lo the speed ratio γsl of which is higher than that of the high-speed position Hi when the second brake B2 is placed in its engaged state while the first brake B1 is placed in its released state. Namely, the automatic transmission 22 is a step-variable transmission having the two speed positions and operable to perform clutch-to-clutch shifting actions in which one of the two coupling devices is engaged while the other coupling device is released. The automatic transmission 22 is shifted between the two speed positions Hi and Lo on the basis of running conditions of the vehicle such as the vehicle speed VL and a required vehicle drive force (such as an operating amount Acc of an accelerator pedal). Described more specifically, the automatic transmission 22 is controlled so as to be shifted to one of the two speed positions on the basis of the detected vehicle running conditions and according to a predetermined shifting map (shifting diagram) in which regions corresponding to the speed positions are defined. The above-described electronic control device 28 also functions as a shifting control device (T-ECU) for controlling the shifting operation of the automatic transmission 22.

When one of the two speed position Lo and Hi the speed ratios γsl and γsh of which are both higher than "1" is selected in a steady state of the automatic transmission 22, the torque input to the output shaft 14 is the output torque Tmg2 of the second electric motor MG2 which has been increased according to the speed ratio of the selected speed position. In a transient state of the shifting operation of the automatic transmission 22, however, the torque input to the output shaft 14 is influenced by an inertia torque depending upon changes of the torque capacities and rotating speeds of the brakes B1, B2. The torque input to the output shaft 14 is a positive drive torque when the second electric motor MG2 is placed in the operated state, and a negative drive torque when the second electric motor MG2 is placed in the non-operated state. The non-operated state of the second electric motor MG2 is interpreted to mean the state in which a rotary motion of the output shaft 14 is transmitted to the second electric motor MG2 through the automatic transmission 22, with a result of a rotary motion of the second electric motor MG2. Thus, the operated and non-operated states of the second electric motor MG2 do not necessarily coincide with the driving and non-driving states of the vehicle.

As described above, the above-described electronic control device 28 functions as the engine control device (E-ECU) for controlling the engine 24, the MG control device (MG-ECU) for controlling the first electric motor MG1 and second electric motor MG2, and the shifting control device (T-ECU) for controlling the automatic transmission 22, for instance. The electronic control device 28 receives signals such as: a signal generated from a first electric motor speed sensor 41 such as a resolver and indicative of the first electric motor speed Nmg1; a signal generated from a second electric motor speed sensor 43 such as a resolver and indicative of the second electric motor speed Nmg2; a signal generated from an output shaft speed sensor 45 and indicative of the output shaft speed Nout corresponding to the vehicle speed VL; a signal generated from a hydraulic switch SW1 and indicative of a hydraulic pressure PB1 of the first brake B1 (hereinafter referred to as "first brake hydraulic pressure PB1"); a signal generated from a hydraulic switch SW2 and indicative of a hydraulic pressure PB2 of the second brake B2 (hereinafter referred to as "second brake hydraulic pressure PB2"); a signal generated from a shift position sensor SS and indicative of a selected operating position of a shift lever 35; a signal generated from an accelerator operation amount sensor AS and indicative of the operating amount Acc of the accelerator pedal 27 (accelerator operating amount Acc); and a signal generated from a brake sensor BS and indicative of an operated or non-operated state of a brake pedal 29. The electronic control device 28 receives other signals generated from sensors not shown such as: a signal indicative of a charging or discharging current Icd (hereinafter referred to as "charging/discharging current" or "input/output current") of the electric-energy storage device 32; a signal indicative of a voltage Vbat of the electric-energy storage device 32; a signal indicative of an electric energy amount SOC stored in (a charging state of) the electric-energy storage device 32; a signal indicative of an electric current amount Img1 supplied from the first inverter 30 to the first electric motor MG1, which electric current Img1 corresponds to the output torque Tmg1 or regenerative torque of the first electric motor MG1; and a signal indicative of an electric current amount Img2 supplied from the second inverter 44 to the second electric motor MG2, which electric current amount Img2 corresponds to the output torque Tmg2 or regenerative torque of the second electric motor MG2.

Figure 4:
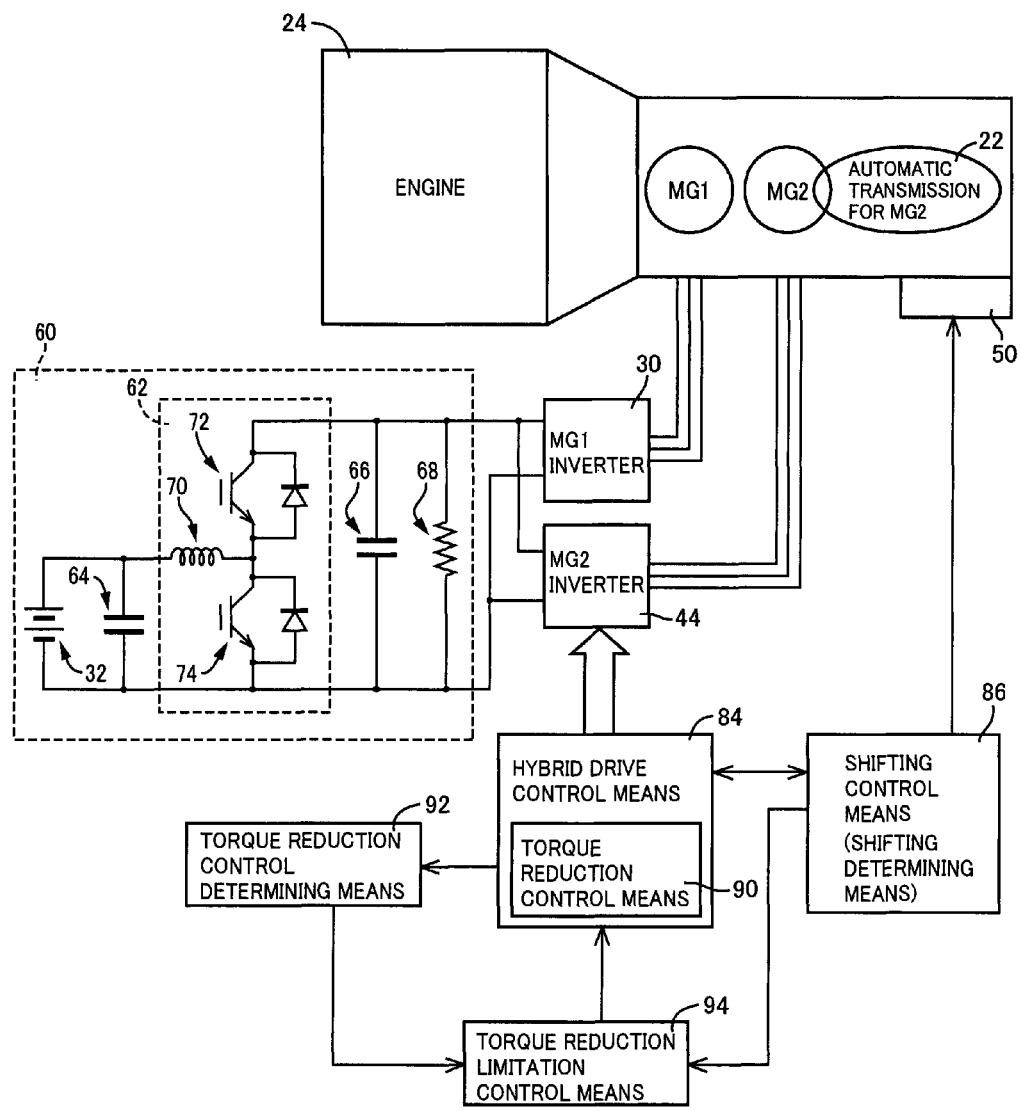
FIG. 4 is a schematic view of a power source control circuit for supplying electric power to a first electric motor and a second electric motor provided in the vehicular power transmitting system of FIG. 1, and a functional block diagram for explaining control functions of major functional portions of an electronic control device.

FIG. 4 is the schematic view of a power source control circuit 60 for supplying electric power to the first electric motor MG1 and the second electric motor MG2, and the functional block diagram for explaining major functional portions of the electronic control device 28.

The vehicular power transmitting system 10 is provided with the electronic control device 28, the first inverter 30, the second inverter 44 (equivalent to an inverter according to the present invention), and the power source control circuit 60. As shown in FIG. 4, the power source control circuit 60 is connected to the first inverter 30 and the second inverter 44, and is provided with the electric-energy storage device 32 (equivalent to an electric motor power source according to the present invention), a voltage converter 62, a smoothing capacitor 64 on the side of the electric-energy storage device 32, a smoothing capacitor 66 on the side of the inverter (equivalent to an inverter smoothing capacitor according to the present invention, and hereinafter referred to as "inverter smoothing capacitor 66"), and a discharging resistor 68.

The electric-energy storage device 32 is a chargeable and dischargeable secondary battery such as a lithium ion assembled battery and a nickel hydrogen assembled battery. The electric-energy storage device 32 may be a condenser or a capacitor, for example.

The voltage converter 62 is provided with a reactor 70 and two switching elements 72 and 74, and is a voltage raising and dropping circuit configured to raise a voltage on the side of the electric-energy storage device 32 for applying the raised voltage to the inverters 30 and 44 when the electric-energy storage device 32 is used to drive the vehicle, and to drop a voltage on the side of the inverters 30, 44 for applying the dropped voltage to the electric-energy storage device 32 when a regenerated energy is stored in the electric-energy storage device 32. A positive pole generator and a negative pole generator of the voltage converter 62 are respectively connected to a positive pole generator and a negative pole generator of the two inverters 30, 44.

The reactor 70 is connected at one of its opposite ends to the positive pole generator of the electric-energy storage device 32, and at the other end to a point of series connection of the two switching elements 72, 74, and is a device capable of accumulating a magnetic energy. The reactor 70 includes a coil wound on a core in the form of a magnetic body, and is utilized as an inductance during application of a high-frequency signal to the coil, cooperating with the switching elements 72, 74 to be able to constitute a voltage raising and dropping circuit.

The two switching elements 72, 74 are connected to each other in series, and are high-power switching transistors disposed between the positive pole generator and the negative pole generator of the inverters 30, 44. The point of connection between the two switching elements 72, 74 is connected to the above-indicated other end of the reactor 70. For example, the switching elements 72, 74 are bi-polar transistors of a gate insulating type. While the switching elements 72, 74 shown in FIG. 4 are of an n-channel type, the switching elements 72, 74 may be of a p-channel type, depending upon the voltage. Two diodes are respectively connected in parallel to the two switching elements 72, 74.

The switching element 72 which is one of the two switching elements 72, 74 is connected at its collector terminal to the positive pole generators of the inverters 30, 44, at its emitter terminal to the collector terminal of the other switching element 74, and at its gate terminal functioning as a control terminal, to a control signal line from the electronic control device 28. The above-indicated other switching element 74 is connected at its collector terminal to the emitter terminal of the above-indicated one switching element 72, as described above, at its emitter terminal to the common negative pole generator of the electric-energy storage device 32 and the inverters 30, 44, and at its gate terminal functioning as a control terminal, to a control signal line from the electronic control device 28.

For example, the switching element 72 is held in its off state while the switching element 74 is placed in its switching state in which the switching element 74 is alternately turned on and off, when the voltage converter 62 performs a voltage raising operation. In this switching state, the switching element 74 is alternately turned on and off with a cycle of repetitions of several hundred thousands per second. When the switching element 74 is placed in its on state in the switching state, the reactor 70 is connected at the above-indicated other end to the negative pole generator, and an electric current flows through the reactor 70, so that an energy is accumulated in the reactor 70. At an instance at which the switching element 74 is turned from its on state to its off state, the energy accumulated in the reactor 70 is discharged so that the voltage at the above-indicated other end is raised. Consequently, the inverter smoothing capacitor 66 is charged, and a terminal voltage Vcon of the inverter smoothing capacitor 66 (hereinafter referred to as "smoothing capacitor voltage Vcon") is raised, if the voltage at the above-indicated other end becomes higher than the smoothing capacitor voltage Vcon, since the other end of the reactor 70 is connected to the inverter smoothing capacitor 66 through the diode connected in parallel to the switching element 72. The smoothing capacitor voltage Vcon, that is, the voltage at the secondary side is raised when the switching element 74 is alternately turned on and off as described above. When this voltage at the secondary side becomes higher than a predetermined reference value, the switching element 74 is brought into the off state by a control circuit not shown. When the secondary voltage becomes lower than the above-indicated reference value, on the other hand, the switching element 74 is brought into the above-indicated switching state. The voltage raising operation thus performed by the voltage converter 62 may not follow an abrupt change of a load on the secondary side of the voltage converter 62. When the amount of consumption of electric power by the inverters 30, 44 abruptly decreases to a large extent, the voltage at the above-indicated secondary side may be temporarily raised due to a delay of switching of the switching element 74 from its switching state to its off state.

The smoothing capacitor 64 on the side of the electric-energy storage device 32 is disposed between the electric-energy storage device 32 and the voltage converter 62, in parallel with the electric-energy storage device 32, and has a function of preventing a voltage change on the low-voltage side of the voltage converter 62, that is, on the side of the electric-energy storage device 32.

The inverter smoothing capacitor 66 is disposed between the inverters 30, 44 and the voltage converter 62, in parallel to the inverters 30, 44, and has a function of preventing a voltage variation (pulsation) on the high-voltage side of the voltage converter 62, that is, on the side of the inverters 30, 44. In other words, the inverter smoothing capacitor 66 is a capacitor connected to the terminal of the electric-energy storage device 32 on the side of the inverters 30, 44, to smooth the voltage input from the electric-energy storage device 32 to the inverters 30, 44, that is, the voltage input from the voltage converter 62 to the inverters 30, 44.

The discharging resistor 68 is a resistor element provided to discharge the electric energy accumulated in the inverter smoothing capacitor 66 when the operation of the power source control circuit 60 is interrupted.

The major functional portions of the electronic control device 28 will then be described by reference to FIG. 4. As shown in FIG. 4, the electronic control device 28 is provided with a hybrid drive control portion in the form of hybrid drive control means 84, a shifting control portion in the form of shifting control means 86, a torque reduction control determining portion in the form of torque reduction control determining means 92, and a torque reduction limitation control portion in the form of torque reduction limitation control means 94. A control operation of the hybrid drive control means 84 is started, upon operation of a power switch with the brake pedal being placed in an operated state after a key has been inserted into a key slot, to calculate a vehicle output required by the vehicle operator, on the basis of the operating amount of the accelerator pedal, and to command the engine 24 and/or the second electric motor MG2 to produce the required vehicle output, so as to drive the vehicle with a high degree of fuel economy and a reduced amount of exhaust emission. For instance, the hybrid drive control means 84 selectively establish one of a motor drive mode, a charging drive mode and an engine drive mode, depending upon the running condition of the vehicle. In the motor drive mode, the second electric motor MG2 is used as the drive power source while the engine 24 is held at rest. In the charging drive mode, the second electric motor MG2 is used as the drive power source while the first electric motor MG1 is operated by the drive force of the engine 24 to generate an electric energy. In the engine drive mode, the drive force of the engine 24 is mechanically transmitted to the drive wheels 18 to drive the vehicle.

The above-described hybrid drive control means 84 controls the first electric motor MG1 to control the engine speed Ne such that the engine 24 operates along a predetermined operation line such as a highest fuel economy curve. Further, the hybrid drive control means 84 implements a torque assisting control by operating the second electric motor MG2, wherein the automatic transmission 22 is placed in the low-speed position Lo at a relatively low value of the vehicle speed VL, to increase an assisting torque input to the output shaft 14, and in the high-speed position Hi at a relatively high value of the vehicle speed VL, to lower the second electric motor speed Nmg2 for performing the torque assisting operation with a high degree of efficiency with a reduced amount of energy loss. In a coasting run of the vehicle, the hybrid drive control means 84 controls the first electric motor MG1 or second electric motor MG2 to be operated by an inertia energy of the running vehicle, to convert the inertia energy into an electric energy to be stored in the electric-energy storage device 32.

In a reverse run of the vehicle, the hybrid drive control means 84 commands the automatic transmission 22 to be placed in the low-speed position Lo, and commands the second electric motor MG2 to be operated in the reverse direction. In this reverse run, the first electric motor MG1 of the first drive power source 12 is placed in its free state, permitting the output shaft 14 to be rotated in the reverse direction, irrespective of the operating state of the engine 24

One example of a control in the above-described engine drive mode will be described more specifically. The hybrid drive control means 84 controls the engine 24 to operate in an operating range of high efficiency, and optimizes a proportion of the drive forces produced by the engine 24 and the second electric motor MG2, and a reaction force produced during generation of the electric energy by the first electric motor MG1, so as to improve the vehicle drivability and fuel economy.

For example, the hybrid drive control means 84 determines a value related to a target drive force, for instance, a required output shaft torque TR (equivalent to a required vehicle drive torque), on the basis of a vehicle output amount required by the vehicle operator such as the accelerator operating amount and the vehicle speed, and according to a predetermined drive force map stored in memory. Then, the hybrid drive control means 84 calculates a required output shaft power based on the required output shaft torque TR while taking account of a required charge amount and so on, and calculates a target engine power required to obtain the required output shaft power, while taking account of the power transmitting loss, loads acting on optional devices, the assisting torque produced by the second electric motor MG2, and the presently selected operating or speed position of the automatic transmission 22. Further, the hybrid drive control means 84 controls the speed and torque of the engine 24 and the amount of generation of the electric energy by the first electric motor MG1, so as to obtain the above-indicated target engine power, such that the engine 24 is operated along the highest fuel economy curve (fuel economy map or relationship) which is obtained by experimentation and stored in memory and which is defined in a two-dimensional coordinate system in which the engine speed and torque, for example, are taken along respective axes, such that the highest fuel economy curve assures both the vehicle drivability and the fuel economy.

The hybrid drive control means 84 is configured such that the electric energy generated by the first electric motor MG1 is supplied to the electric-energy storage device 32 and the second electric motor MG2 through the inverters 30, 44, so that a major portion of the drive force of the engine 24 is transmitted to the output shaft 14 in a mechanical manner, while other portion of the drive force of the engine 24 is consumed to operate the first electric motor MG1 to convert this portion of the drive force into the electric energy, which is supplied to the second electric motor MG2 through the inverter 30, 44, to operate the second electric motor MG2 to produce a drive force to be transmitted to the output shaft 14. Devices associated with the generation of the electric energy and the consumption of the generated electric energy by the second electric motor MG2 cooperate to constitute an electric path by which a portion of the drive force of the engine 24 is converted into an electric energy which is converted into a mechanical energy. In this connection, it is noted that the hybrid drive control means 84 is also configured to operate the second electric motor MG2 with the electric energy supplied thereto directly from the electric-energy storage device 32 through the second inverter 44, rather than the electric energy supplied thereto through the electric path.

The hybrid drive control means 84 is further configured to control the operation of the first electric motor MG1 such that the engine speed is held substantially constant or controlled to a desired value with using the differential operation of the planetary gear set 26, irrespective of whether the vehicle is stationary or running. In other words, the hybrid drive control means 84 can control the operating speed of the first electric motor MG1 to a desired value while holding the engine speed substantially constant or controlling the engine speed to the desired value.

The hybrid drive control means 84 is further functionally provided with engine output control means for implementing output controls of the engine 24 including a throttle control of commanding a throttle actuator to open and close an electronic throttle valve, a fuel injection control of commanding a fuel injection device to control an amount and a timing of injection of a fuel, and an ignition timing control of commanding an ignition device such as an igniter to control an ignition timing, such that the throttle control, fuel injection control and ignition timing control are implemented alone or in combination, so that the engine 24 produces the required output.

The hybrid drive control means 84 implements an engine starting control of starting the engine 24 when the hybrid drive control means 84 determines switching of the vehicle drive mode from the motor drive mode for driving the vehicle with the second electric motor MG2 to the engine drive mode for driving the vehicle with the engine 24, for example, according to a predetermined drive mode switching map (not shown) for changing the vehicle drive mode. In the engine starting control, the speed Ne of the engine 24 is electrically raised by controlling the first electric motor MG1 and the second electric motor MG2 and utilizing the differential operation of the planetary gear set 26. When the engine speed Ne has been raised to a predetermined ignition permissible value Nig, the fuel ignition device is actuated to implement the fuel ignition control, while the ignition device is actuated to implement the ignition timing control, so that the engine 24 is started. It is noted that the above-indicated drive mode switching map is a two-dimensional map representing a relationship between the vehicle speed VL and the operation amount Acc of the accelerator in the form of the accelerator pedal 27, for example. The drive mode switching map defines a motor drive mode region in which the motor drive mode using the second electric motor MG2 is selected, and an engine drive mode region in which the engine drive mode using the engine 24 is selected. For instance, the motor drive mode region is a region in which the vehicle is driven at a comparatively low speed with a comparatively small drive force (with a comparatively small amount of operation of the accelerator pedal), while the engine drive mode region is a region in which the vehicle is driven at a medium or high speed with a medium or large drive force (with a medium or large amount of operation of the accelerator pedal).

Accordingly, the motor drive mode using the second electric motor MG2 is selected when the vehicle is started or driven with a low load, for instance. After the vehicle has been accelerated in the motor drive mode, the vehicle drive mode is switched from the motor drive mode to the engine drive mode. In this case, the hybrid drive control means 84 implements the engine starting control. When the electric energy amount SOC stored in the electric-energy storage device 32 has been reduced below a predetermined lower limit, the hybrid drive control means 84 implements the engine starting control, even if the present vehicle running condition falls within the motor drive mode region.

Figure 5:
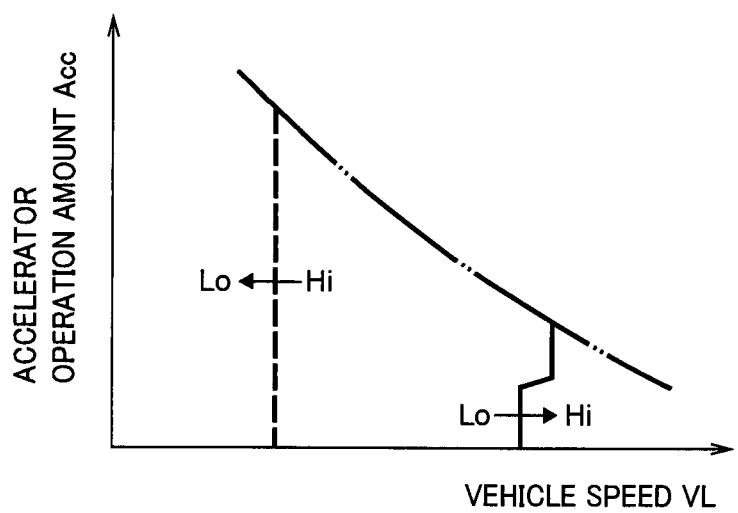
FIG. 5 is a view showing a predetermined shifting map for determining a shifting action of the automatic transmission in the vehicular power transmitting system of FIG. 1, on the basis of a vehicle speed and an operation amount of an accelerator pedal.

The shifting control means 86 determines a shifting action of the automatic transmission 22 on the basis of the vehicle speed VL and the accelerator operation amount Acc, and according to a predetermined shifting map stored in memory, which is illustrated in FIG. 5 by way of example. On the basis of this determination, the shifting control means 86 implements a shifting control of controlling the first brake B1 and the second brake B2 so as to perform the determined shifting action. In FIG. 5, a solid line indicates a shift-up line for shifting the automatic transmission 22 from the low-speed position Lo to the high-speed position Hi, while a broken line indicates a shift-down line for shifting the automatic transmission 22 from the high-speed position Hi to the low-speed position Lo. Namely, a suitable amount of hysteresis is provided between the shift-up and shift-down lines. These shift-up and shift-down lines indicated by the solid and broken lines correspond to a shifting rule according to which the automatic transmission 22 is shifted. That is, the shifting control means 86 is functionally provided with shifting determining means for determining the shifting action of the automatic transmission 22 according to the shifting map illustrated in FIG. 5.

For shifting the automatic transmission 22 to the speed position determined as described above, the shifting control means 86 applies a shifting command to a hydraulic control circuit 50 of the automatic transmission 22. According to the shifting command, linear solenoid valves incorporated in the hydraulic control circuit 50 are controlled to place the first brake B1 and the second brake B2 in the appropriate operating states.

When the vehicle speed has exceeded a value represented by the shift-up line as a result of acceleration of the vehicle during its running in the low-speed position Lo (with the second brake B2 placed in the engaged state), for instance, the shifting control is implemented to release the second brake B2 and to engage the first brake B1, for example. When the vehicle speed has been lowered below a value represented by the shift-down line as a result of deceleration of the vehicle during its running in the high-speed position Hi (with the first brake B1 placed in the engaged state), for instance, the shifting control is implemented to release the first brake B1 and to engage the second brake B2.

As shown in FIG. 4, the above-described hybrid drive control means 84 is provided with torque reduction control means 90. This torque reduction control means 90 executes torque reduction control, i.e. temporarily reduces the output torque Tmg2 of the second electric motor MG2 (hereinafter referred to as "second electric motor torque Tmg2") during a shifting operation (a "power-on shift-up action", in particular) of the automatic transmission 22, with respect to the value before the shifting action. This torque reduction control is implemented for reducing a shifting shock of the automatic transmission 22 and for the other purposes. For instance, the torque reduction control means 90 may be configured to determine whether the above-indicated torque reduction control should be implemented or not, depending upon the accelerator operation amount Acc and the speed positions established before and to be established after the shifting action. As indicated in a time chart of FIG. 6 described below, the torque reduction control means 90 implements the torque reduction control by detecting a point of time of initiation of an inertia phase of the shifting action of the automatic transmission 22, on the basis of the second electric motor speed Nmg2, and reducing the second electric motor torque Tmg2 after the detected point of time of initiation of the inertia phase. The torque reduction control will be explained by reference to the time chart of FIG. 6.

Figure 6:
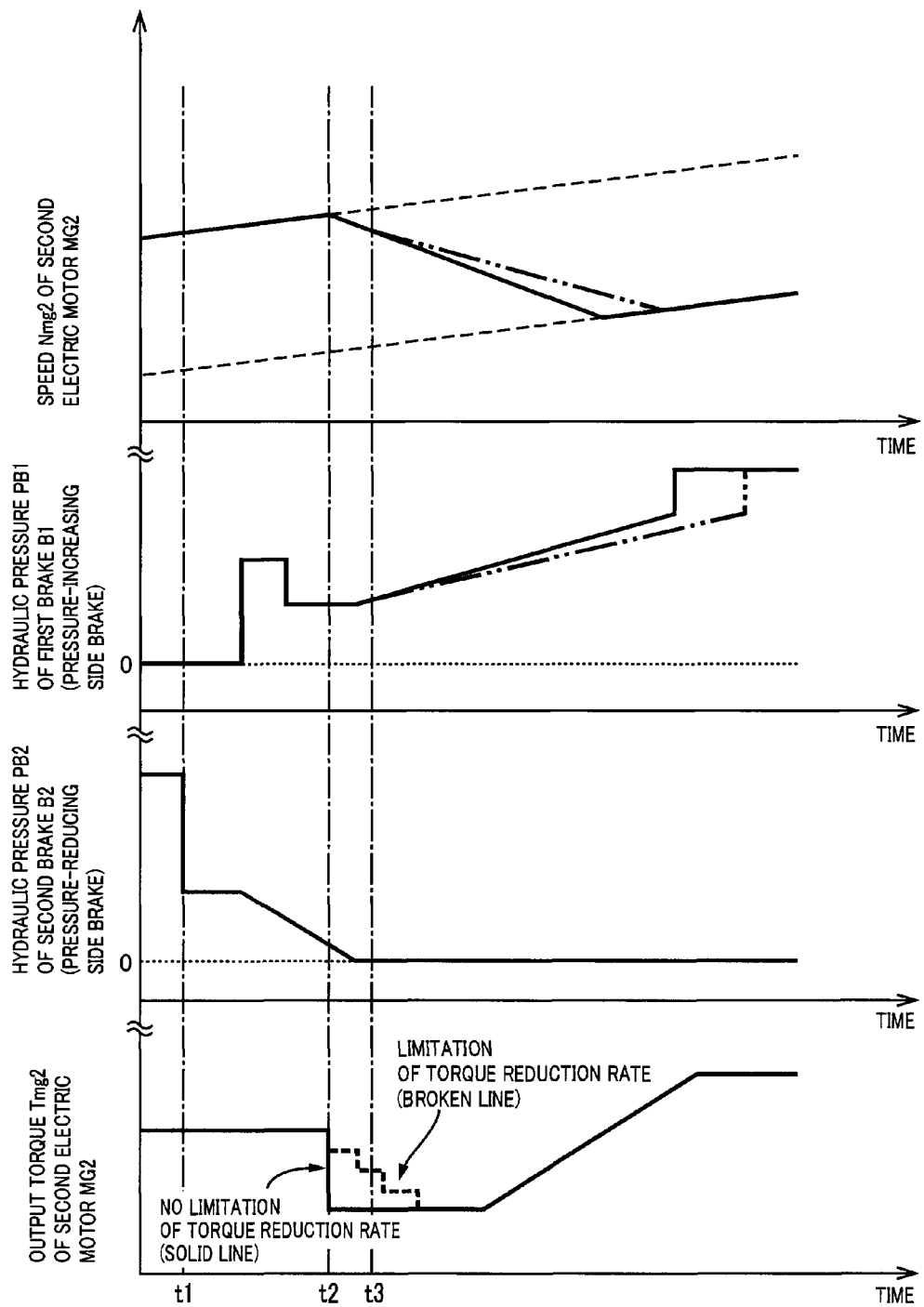
FIG. 6 is a time chart for explaining an example of a torque reduction control implemented during a shift-up action of the automatic transmission in the vehicular power transmitting system of FIG. 1 during an operation of the accelerator pedal.

FIG. 6 is the time chart for explaining an example of the above-described torque reduction control implemented during the shift-up action of the automatic transmission 22 from the low-speed position Lo to the high-speed position Hi during an operation of the accelerator pedal. In the example of FIG. 6, the shifting control means 86 determines the above-indicated shift-up action, according to the shifting map of FIG. 5, before a point of time t1, for instance. According to this determination of the shift-up action, the releasing action of the second brake B2 which is the releasing side (pressure-reducing side) coupling device to be released for performing the shift-up action is initiated at the point of time t1, that is, the second brake hydraulic pressure PB2 is reduced at the point of time t1, as indicated in the time chart of FIG. 6. On the other hand, the first brake B1 which is the engaging side (pressure-increasing side) coupling device to be engaged for performing the above-indicated shift-up action is temporarily held in a low-pressure standby state after a fast pressure increase between the point of time t1 and a point of time t2, to eliminate a mechanical clearance for improving an operating response of the first brake B1, as is apparent from the first brake hydraulic pressure PB1 also indicated in the time chart.

A point of time t2 is the point of time at which the inertia phase of the above-indicated shift-up action is initiated. The second electric motor speed Nmg2 is lowered toward a value to be established after the shift-up action, as indicated by a solid line in FIG. 6, as the first brake hydraulic pressure PB1 (indicated by a solid line in FIG. 6) which is the hydraulic pressure of the engaging side (applied pressure) brake is increased, namely, as the engaging force of the first brake B1 is increased, after the point of time t2 to a point of time of termination of the shift-up action. The determination as to whether the inertia phase is initiated is made on the basis of a lapse of time from the point of time t1, or the second electric motor speed Nmg2, for example.

As indicated by a solid line in the time chart for the second electric motor torque Tmg2 of FIG. 6, the torque reduction control means 90 implements the above-described torque reduction control in the inertia phase initiated at the point of time t2. That is, the second electric motor torque Tmg2 is abruptly reduced at the point of time t2 relative to the former value. To reduce the second electric motor torque Tmg2 at the point of time t2, the torque reduction control means 90 determines a second electric motor torque change rate $\Delta$Tmg2 for the torque reduction, which is an amount of change of the second electric motor torque Tmg2 per unit time, at least before the moment of initiation of reduction of the second electric motor torque Tmg2, for example. In this case, the torque reduction control means 90 may use the predetermined second electric motor torque change rate $\Delta$Tmg2 at the point of time t2 stored in memory, or determine the second electric motor torque change rate $\Delta$Tmg2 using predetermined relation on the basis of the second electric motor speed Nmg2, second electric motor torque Tmg2 and the speed positions before and after the shift-up action. When the second electric motor torque Tmg2 is abruptly reduced at the point of time t2, for example, an output Pmg2 of the second electric motor MG2 (hereinafter referred to as "second electric motor output Pmg2") is also abruptly reduced, and the output of the voltage converter 62 may not follow this abrupt reduction. In this event, the smoothing capacitor voltage Vcon is temporarily raised in relation to this reduction of the second electric motor torque Tmg2. To prevent this temporary rise of the smoothing capacitor voltage Vcon, the torque reduction limitation control means 94 described below may limit the reduction of the second electric motor torque Tmg2 in the above-described torque reduction control. This aspect will be described.

After the abrupt reduction of the second electric motor torque Tmg2 at the point of time t2 indicated in FIG. 6, the second electric motor torque Tmg2 is increased to a target value to be established after the shift-up action as time goes by. This target value of the second electric motor torque Tmg2 after the shift-up action is made higher than the value before the shift-up action, in order to prevent the vehicle operator from perceiving a drop of the vehicle drive force due to the shift-up action of the automatic transmission 22.

Referring back to FIG. 4, the torque reduction control determining means 92 determines whether the torque reduction control by the torque reduction control means 90 is being implemented. For instance, the torque reduction control means 90 determines whether the above-indicated torque reduction control should be implemented or not, prior to initiation of reduction of the second electric motor torque Tmg2. The torque reduction control determining means 92 determines that the torque reduction control is being implemented, when it is determined that the torque reduction control should be implemented.

The torque reduction limitation control means 94 implements a torque reduction limitation control to limit the reduction of the second electric motor torque Tmg2, for preventing a temporary rise of the terminal voltage Vcon of the inverter smoothing capacitor 66 due to the reduction (at the point of time t2 indicated in FIG. 6, for instance) of the second electric motor torque Tmg2 during the above-indicated torque reduction control, beyond a withstanding voltage Vmax of the inverters 30, 44. Namely, the torque reduction limitation control is implemented such that the second electric motor torque change rate $\Delta$Tmg2 during the reduction of the second electric motor torque Tmg2 is limited to within a predetermined range, so that the second electric motor torque change rate $\Delta$Tmg2 is made lower than that where the reduction of the second electric motor torque Tmg2 is not limited, whereby the terminal voltage Vcon of the inverter smoothing capacitor 66 is prevented from exceeding the inverter withstanding voltage Vmax of the inverters 30, 44. Described in detail, the torque reduction limitation control means 94 determines a torque reduction rate limiting range WTL as the above-indicated predetermined range, before initiation of the limitation of the above-indicated torque reduction control, such that the terminal voltage Vcon of the inverter smoothing capacitor 66 upon reduction of the second electric motor torque Tmg2 in the above-indicated torque reduction control does not exceed the withstanding voltage Vmax of the inverters 30, 44, as long as the second electric motor torque change rate $\Delta$Tmg2 is held within the determined torque reduction rate limiting range WTL, so that the torque reduction limitation is implemented to limit the second electric motor torque change rate $\Delta$Tmg2 to within the torque reduction rate limiting range WTL, for thereby limiting the reduction of the second electric motor torque Tmg2. In other words, the torque reduction control limitation control means 94 limits the reduction of the second electric motor torque Tmg2 by limiting the second electric motor torque change rate ΔTmg2 upon reduction of the second electric motor torque Tmg2 in the above-indicated torque reduction control, to within the above-indicated torque reduction rate limiting range WTL. It is noted that the second electric motor torque change rate ΔTmg2 is a positive value when the second electric motor torque Tmg2 is increased, and a negative value when the second electric motor torque Tmg2 is reduced. The above-indicated torque reduction rate limiting range WTL is not defined by a positive limit value (upper limit), and is defined by a negative limit value (lower limit) in the form of a torque reduction rate limit value ΔTL. This torque reduction rate limit value ΔTL is a negative value, since the torque reduction rate limit value ΔTL is the limit value of the second electric motor torque change rate ΔTmg2 upon reduction of the second electric motor torque Tmg2. In other words, the limitation of the second electric motor torque change rate ΔTmg2 to within the torque reduction rate limiting range WTL by the torque reduction limitation control is interpreted to mean the limitation of the absolute value of the second electric motor torque change rate ΔTmg2 to or below the absolute value of the torque reduction rate limit value ΔTL, and the limitation of the second electric motor torque change rate ΔTmg2 to or above the torque reduction rate limit value ΔTL where the positive and negative signs of ΔTmg2 and ΔTL are taken into account.

Described more specifically, the torque reduction limitation control means 94 determines, in its torque reduction limitation control, the above-indicated torque reduction rate limit value ΔTL, before initiation of reduction of the second electric motor torque Tmg2 in the above-indicated torque reduction control by the torque reduction control means 90. During the torque reduction control by the torque reduction control means 90, the torque reduction limitation control means 94 limits commanded torque values applied from the torque reduction control means 90 to the second inverter 44 from time to time to determine the second electric motor torque Tmg2, such that the absolute value of the second electric motor torque change rate ΔTmg2 is held not larger than the absolute value of the torque reduction rate limit value ΔTL. To limit the commanded torque values, the torque reduction limitation control means 94 initially obtains from the torque reduction control means 90, the torque value to be commanded in the next cycle and the torque value commanded in the last cycle in the reduction control of the second electric motor torque Tmg2. Then, the torque reduction limitation control means 94 calculates the above-indicated second electric motor torque change rate ΔTmg2, by subtracting the second electric motor torque Tmg2 corresponding to the torque value commanded in the last cycle, from the second electric motor torque Tmg2 corresponding to the torque value to be commanded in the next cycle, to obtain a torque difference, and by dividing the obtained torque difference by a length of time between the moments of generation of the above-indicated two commanded torque values. This length of time is predetermined Then, the torque reduction limitation control means 94 compares the second electric motor torque change rate ΔTmg2 calculated from the above-indicated commanded torque values, namely, the second electric motor torque change rate ΔTmg2 estimated from the above-indicated torque value to be commanded in the next cycle, with the torque reduction rate limit value ΔTL, and limits the torque value to be commanded in the next cycle by the torque reduction control means 90, such that the absolute value of the second electric motor torque change rate ΔTmg2 is held not larger than the absolute value of the torque reduction rate limit value ΔTL, if the comparison indicates that the absolute value of the second electric motor torque change rate ΔTmg2 is larger than the absolute value of the torque reduction rate limit value ΔTL. If the torque reduction control means 90 is informed of the limitation of the torque value to be commanded in the next cycle, the torque reduction control means 90 applies the limited commanded torque value to the second inverter 44 in the next cycle of the torque reduction control to reduce the second electric motor torque Tmg2, according to the limitation by the torque reduction limitation control means 94 described above. The time chart of FIG. 6 shows an example of the above-indicated torque reduction limitation control of the second electric motor torque Tmg2, as compared with the normal torque reduction control without the limitation. If the above-indicated torque reduction limitation control to limit the reduction rate of the second electric motor torque Tmg2 is not implemented, the second electric motor torque Tmg2 changes as indicated by the solid line in FIG. 6, after the point of time t2. If the second electric motor torque change rate (torque reduction rate) ΔTmg2 during the torque reduction in the torque reduction control is limited by the above-indicated torque reduction limitation control, the second electric motor torque Tmg2 is reduced at a lower rate as indicated by the broken line, than that indicated by the solid line. It is noted that steps indicated by the broken line in FIG. 6 schematically illustrate the respective commanded torque values generated in the respective cycles to change the second electric motor torque Tmg2.

The moment at which the above-indicated torque reduction limitation control is initiated is not particularly limited. For example, the torque reduction limitation control means 94 may initiate the above-indicated torque reduction limitation control when the torque reduction control means 90 determines to implement the above-indicated torque reduction control, that is, when the torque reduction control determining means 92 determines that the torque reduction control is being implemented, while the shifting control means 86 determines according to the shifting map indicated in FIG. 5 that a shifting action of the automatic transmission 22 should be performed. It is noted that although the withstanding voltage Vmax of the first inverter 30 and the withstanding voltage Vmax of the second inverter 44 may be different from each other, these withstanding voltages Vmax are equal to each other in the present embodiment. Where the two withstanding voltages Vmax are different from each other, the lower one of the withstanding voltages Vmax is used to implement the above-indicated torque reduction limitation control. The withstanding voltages Vmax of the inverters 30, 44 are predetermined according to the kinds of these inverters 30, 44. In the following description, the withstanding pressures Vmax of the inverters 30, 44 will be referred to simply as "inverter withstanding pressure Vmax".

As described above, the above-indicated torque reduction rate limiting range WTL is determined so that the terminal voltage Vcon of the inverter smoothing capacitor 66 will not exceed the inverter withstanding voltage Vmax. Accordingly, the torque reduction rate limit value ΔTL used in the above-indicated torque reduction limitation control is similarly determined so that the terminal voltage Vcon of the inverter smoothing capacitor 66 will not exceed the inverter withstanding voltage Vmax. This torque reduction rate limit value ΔTL may be determined in various different manners. For instance, the torque reduction rate limit value ΔTL is a constant value predetermined by experimentation. In other words, the above-indicated torque reduction rate limiting range WTL may be a constant range predetermined by experimentation. Where the torque reduction rate limit value ΔTL is determined to be a constant value, for example, a maximum value of the second electric motor torque change rate ΔTmg2 that can appear during the torque reduction in the above-indicated torque reduction control in a certain running condition of the vehicle is obtained by experimentation such that the smoothing capacitor voltage Vcon will not exceed the inverter withstanding voltage Vmax in that running condition of the vehicle. The obtained maximum value of the second electric motor torque change rate ΔTmg2 is stored as the torque reduction rate limit value ΔTL (constant) in the torque reduction limitation control means 94. For instance, the above-indicated torque reduction rate limit value ΔTL (constant) is determined on the basis of the inverter withstanding voltage Vmax, an electrostatic capacity Ccon of the inverter smoothing capacitor 66, a predetermined range of the second electric motor speed Nmg2, and a second electric motor speed change rate ΔNmg2 preliminarily estimated by experimentation during the shifting action of the automatic transmission 22.

The torque reduction limitation control means 94 may determine the torque reduction rate limit value ΔTL on the basis of a selected parameter, rather than determines this limit value ΔTL as a constant value. For instance, the torque reduction limitation control means 94 determines the torque reduction rate limit value ΔTL on the basis of the second electric motor speed Nmg2, the smoothing capacitor voltage Vcon or the operating positions of the automatic transmission 22 before and after the shifting action, and according to a predetermined relationship (map) obtained by experimentation. In this case, the torque reduction limitation control means 94 may determine the torque reduction rate limit value ΔTL upon determination of the shifting action by the shifting control means 86, and continuously use the determined torque reduction rate limit value ΔTL until the above-indicated torque reduction control during the shifting action is terminated, or alternatively may determine and update the torque reduction rate limit value ΔTL from time to time during the torque reduction limitation control. Where the torque reduction limitation control means 94 determines the torque reduction rate limit value ΔTL according to the above-indicated map, this map is obtained by experimentation in which the selected parameter such as the above-indicated second electric motor speed Nmg2 is changed, and the maximum value of the second electric motor torque change rate ΔTmg2 below which the smoothing converter voltage Vcon will not exceed the inverter withstanding voltage Vmax is obtained at each of the different values of the parameter, as in the above-described case of determination of the torque reduction rate limit value ΔTL as a constant value. The map represents a relationship between the different values of the parameter and the respective values of the second electric motor torque change rate ΔTmg2 as the respective torque reduction rate limit values ΔTL. The map thus obtained is stored in the torque reduction limitation control means 94. Examples of the map stored in the torque reduction limitation control means 94 are illustrated in FIGS. 7 and 8. FIG. 7 is the table indicating an example of a map for determining the torque reduction rate limit value (torque reduction rate threshold value) ΔTL on the basis of the second electric motor speed Nmg2 used as the parameter during the torque reduction limiting control implemented by a torque reduction limitation control means 94. FIG. 8 is the table indicating an example of a map for determining the torque reduction rate limit value (torque reduction rate threshold value) ΔTL on the basis of the smoothing capacitor voltage Vcon used as the parameter during the torque reduction limiting control implemented by the torque reduction limitation control means 94. As is apparent from the tables of FIGS. 7 and 8, the torque reduction limitation control means 94 determines the torque reduction rate limit value ΔTL on the basis of the second electric motor speed Nmg2 or smoothing capacitor voltage Vcon such that the torque reduction rate limit value ΔTL is reduced toward zero with an increase of the second electric motor speed Nmg2 or smoothing capacitor voltage Vcon. Where the torque reduction rate limit value ΔTL is determined on the basis of the operating positions of the automatic transmission 22 before and after the shifting action, the torque reduction rate limit value ΔTL is reduced toward zero with an increase of a stepping ratio of the automatic transmission 22 which is a difference between the speed ratios γs of the operating positions before and after the shifting action.

To determine the torque reduction rate limit value ΔTL according to the above-indicated map, a single parameter or a plurality of parameters may be used. For example, the plurality of parameters consist of the second electric motor speed Nmg2 of FIG. 7 and the smoothing capacitor voltage Vcon of FIG. 8. In this example, the torque reduction limitation control means 94 determines the torque reduction rate limit values ΔTL according to the respective maps of FIGS. 7 and 8, and selects one of the determined torque reduction rate limit values ΔTL whose absolute value is smaller than that of the other, as the torque reduction rate limit value ΔTL used for limiting the second electric motor torque change rate ΔTmg2.

In another example, the torque reduction limitation control means 94 obtains from time to time the second electric motor speed Nmg2 and the smoothing capacitor voltage Vcon, and calculates and determines the torque reduction change rate limiting range WTL, that is, the torque reduction rate limit value ΔTL, on the basis of the obtained second electric motor speed Nmg2, an amount of change ΔPnm of a second electric motor output Pmg2 per unit time (hereinafter referred to as "second electric motor speed output change rate ΔPnm") due to a change of the second electric motor speed Nmg2, and the obtained smoothing capacitor voltage Vcon. A process of calculating the torque reduction rate limit value ΔTL in this example will be described more specifically by reference to FIG. 9. As in the case of determination of the torque reduction rate limit value ΔTL according to the above-indicated maps, the torque reduction limitation control means 94 may determine the torque reduction rate limit value ΔTL upon determination of the shifting action by the shifting control means 86, and continuously use the determined torque reduction rate limit value ΔTL as a fixed value until the shifting action is terminated or alternatively may determine and update the torque reduction rate limit value ΔTL from time to time during the torque reduction limitation control.

Figure 9:
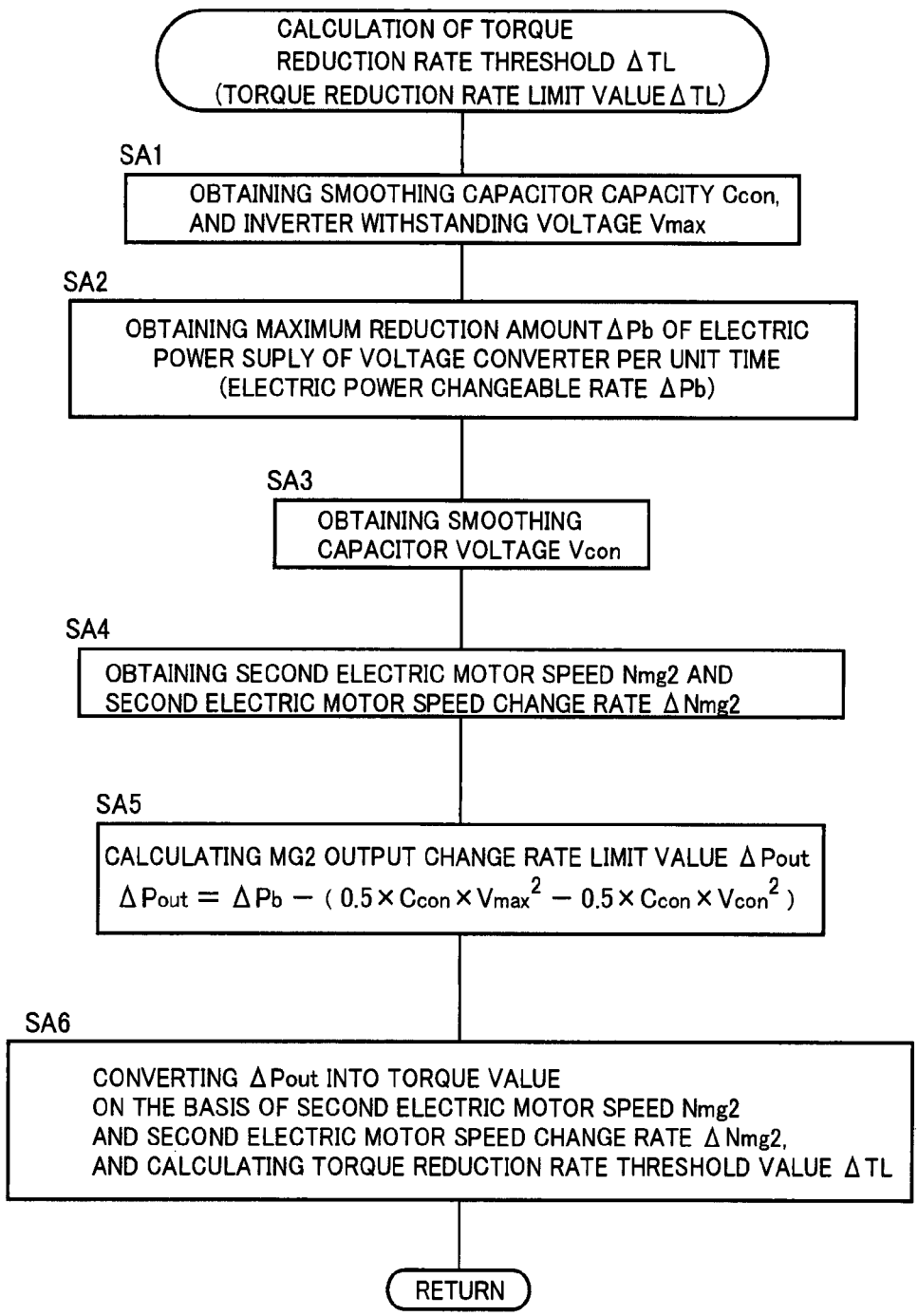
FIG. 9 is a flow chart for explaining a process of calculating the torque reduction rate limit value on the basis of the operating speed of the second electric motor, a speed output change rate of the second electric motor, and the voltage of the smoothing capacitor, as an example of a process of determining from time to time the torque reduction rate limit value during the torque reduction limiting control implemented by the torque reduction limitation control means 94 of FIG. 4.

FIG. 9 is the flow chart for explaining the process of calculating the torque reduction rate limit value ΔTL on the basis of the second electric motor speed Nmg2, the second electric motor speed output change rate ΔPnm, and the smoothing capacitor voltage Vcon, as an example of the process of determining from time to time the torque reduction rate limit value ΔTL during the torque reduction limiting control implemented by the torque reduction limitation control means 94. This process is repeatedly executed with an extremely short cycle time of about several milliseconds to about several tens of milliseconds.

Initially, the torque reduction limitation control means 94 obtains, in step SA1 of FIG. 9 (hereinafter "step" being omitted), the electrostatic capacity Ccon of the smoothing capacitor 66 (hereinafter referred to as "smoothing capacitor capacity Ccon"), and the inverter withstanding voltage Vmax. In SA2, the torque reduction limitation control means 94 obtains a maximum amount of reduction ΔPb of electric power per unit time to be supplied from the voltage converter 62 to the inverters 30, 44 (hereinafter referred to as "electric power changeable rate ΔPb"). The above-indicated smoothing capacitor capacity Ccon, inverter withstanding voltage Vmax and electric power changeable rate ΔPb are all predetermined design values, namely, preset constant values.

Then in SA3, the torque reduction limitation control means 94 obtains the smoothing capacitor voltage Vcon, on the basis of an output of a voltage sensor. In SA4, the torque reduction limitation control means 94 calculates and obtains the second electric motor speed Nmg2 on the basis of an output of the second electric motor speed sensor 43, and the amount of change ΔNmg2 of the second electric motor speed Nmg2 per unit time (hereinafter referred to as "second electric motor speed change rate ΔNmg2") on the basis of the second electric motor speed value Nmg2 detected from time to time.

Then in SA5, the torque reduction limitation control means 94 calculates a limit value ΔPout of an amount of change of the second electric motor output Pmg2 per unit time (hereinafter referred to as "second electric motor output change rate limit value ΔPout"), below which the smoothing capacitor voltage Vcon will not exceed the inverter withstanding voltage Vmax. Described more specifically, the second electric motor output change rate limit value ΔPout is calculated according to the following equation (1), and on the basis of the electric power changeable rate ΔPb, the smoothing capacitor capacity Ccon, the inverter withstanding voltage Vmax, and the smoothing capacitor voltage Vcon obtained in SA3.

$$\Delta Pout = \Delta Pb - (0.5 \times Ccon \times Vmax^2 - 0.5 \times Ccon \times Vcon^2) \quad (1)$$

Then in SA6, the torque reduction limitation control means 94 converts the second electric motor output change rate ΔPout into a torque value on the basis of the second electric motor speed Nmg2 and the second electric motor speed change rate ΔNmg2 (second electric motor acceleration ΔNmg2), and calculates the torque reduction rate limit value (torque reduction rate threshold value) ΔTL. Described more specifically, the above-indicated second electric motor torque Tmg2 is obtained on the basis of the electric current amount Img2 of supply to the second electric motor MG2, and the above-indicated second electric motor speed output change rate ΔPnm is calculated according to the following equation (2), and on the basis of the obtained second electric motor torque Tmg2, and the second electric motor speed change rate ΔNmg2. Then, the torque reduction rate limit value ΔTL is calculated according to the following equation (3), and on the basis of the calculated second electric motor output change rate ΔPnm, the second electric motor speed Nmg2 and the second electric motor output change rate limit value ΔPout.

$$\Delta Pnm = Tmg2 \times \Delta Nmg2 \quad (2)$$

$$\Delta TL = (\Delta Pout - \Delta Pnm)Nmg2 \quad (3)$$

As described above, the torque reduction limitation control means 94 determines the torque reduction rate limit value ΔTL from time to time during the torque reduction limitation control.

It is noted that the second electric motor output Pmg2 changes even when the second electric motor speed Nmg2 changes, so that the above-indicated torque reduction limitation control by the torque reduction limitation control means 94 may be insufficient to prevent the smoothing capacitor voltage Vcon from exceeding the inverter withstanding voltage Vmax during the above-indicated torque reduction control. If it is determined that the torque reduction limitation control is insufficient, it is effective to adjust the second electric motor speed change rate ΔNmg2 according to the engaging force of the above-indicated engaging side coupling device during the shifting action of the automatic transmission 22. In this respect, this function of adjusting the second electric motor speed change rate ΔNmg2 may be added to the control functions performed by the functional portions shown in FIG. 4. The major control functions of the electronic control device 28 modified to add this adjusting function will be described.

Figure 10:
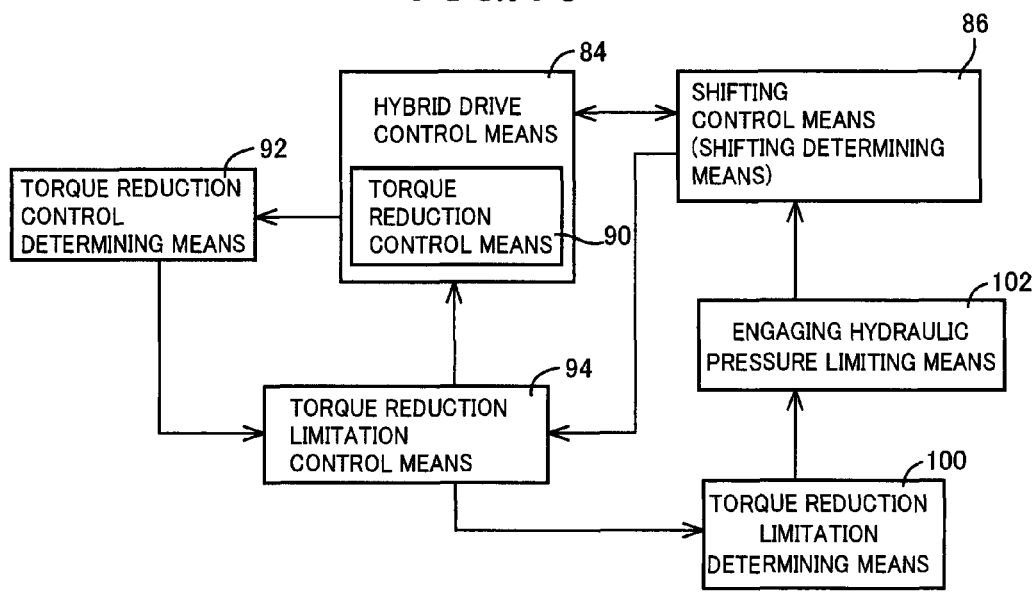
FIG. 10 is a functional block diagram for explaining control functions for adjusting an engaging force of an engaging-side coupling device of the automatic transmission, so as to prevent the voltage of the smoothing capacitor from exceeding an inverter withstanding voltage during the torque reduction control, in addition to the control functions of the functional portions shown in the functional block diagram of FIG. 4.

FIG. 10 is the functional block diagram for explaining the control functions for adjusting the engaging force of the above-indicated engaging-side coupling device, so as to prevent the smoothing capacitor voltage Vcon from exceeding the inverter withstanding voltage Vmax during the above-described torque reduction control, in addition to the control functions of the functional portions shown in the functional block diagram of FIG. 4. The electronic control device 28 the control functions of which are shown in FIG. 10 is provided with a torque reduction limitation determining portion in the form of torque reduction limitation determining means 100 and an engaging force limiting portion in the form of engaging hydraulic pressure limiting means 102, in addition to the above-described hybrid drive control means 84, shifting control means 86, torque reduction control determining means 92 and torque reduction limitation control means 94.

The torque reduction limitation determining means 100 is configured to determine whether the above-indicated torque reduction limitation control is insufficient to prevent the smoothing capacitor voltage Vcon from exceeding the inverter withstanding voltage Vmax during the above-indicated torque reduction control. For instance, the torque reduction limitation determining means 100 implements from time to time the determination as to whether the above-indicated torque reduction limitation control is insufficient or not, on the basis of the parameters such as the operating positions of the automatic transmission 22 before and after the shifting action, the second electric motor speed Nmg2, and the electric current amount Img2 of supply to the second electric motor MG2 from the second inverter 44 detected by an electric current sensor, and according to a predetermined relationship (e.g. map) obtained by experimentation to determine the insufficiency of the torque reduction limitation control on the basis of those parameters. That is, the torque reduction limitation determining means 100 estimates from time to time the sufficiency or insufficiency of the torque reduction limitation control, on the basis of the above-indicated parameters and according to the predetermined relationship (map). The torque reduction limitation determining means 100 makes the determination as to whether the torque reduction limitation control is insufficient or not, during the above-indicated torque reduction control implemented during the shift-up action of the automatic transmission 22, for instance. Alternatively, the torque reduction limitation determining means 100 may be configured to determine that the above-indicated torque reduction limitation control is insufficient, if the second inverter 44 or the second electric motor MG2 fails to operate. This determination may be made prior to the shifting action of the automatic transmission 22. The insufficiency of the above-indicated torque reduction limitation control is interpreted to mean a state determined by experimentation, in which there is a possibility of the smoothing capacitor voltage Vcon exceeding the inverter withstanding voltage Vmax even when the reduction of the second electric motor torque Tmg2 is limited by the above-indicated torque reduction limitation control.

The engaging hydraulic pressure limiting means 102 is configured to reduce a rate of rise of the engaging force of the above-indicated engaging side coupling device, namely, the first brake B1, in the inertia phase of the shift-up action of the automatic transmission 22, when the torque reduction limitation determining means 100 obtains an affirmative determination that the above-indicated torque reduction limitation control is insufficient to prevent the smoothing capacitor voltage Vcon from exceeding the inverter withstanding voltage Vmax during the above-described torque reduction control, with respect to a rate of rise of the engaging force when the torque reduction limitation determining means 100 obtains a negative determination. For example, the first brake hydraulic pressure PB1 and the second electric motor speed Nmg2 are respectively raised and lowered at lower rates, by the engaging hydraulic pressure limiting means 102 in the above-indicated inertia phase initiated at the point of time t2, as indicated by two-dot chain lines in FIG. 6, when the torque reduction limitation determining means 100 obtains the affirmative determination, as compared with the rates indicated by solid lines in the time chart of FIG. 6 when the torque reduction limitation determining means 100 obtains the negative determination. In the example of FIG. 6, the reduction of the rate of rise of the first brake hydraulic pressure PB1 indicated by the two-dot chain line, with respect to the rate of rise indicated by the solid line, is initiated at the point of time t3.

Figure 11:
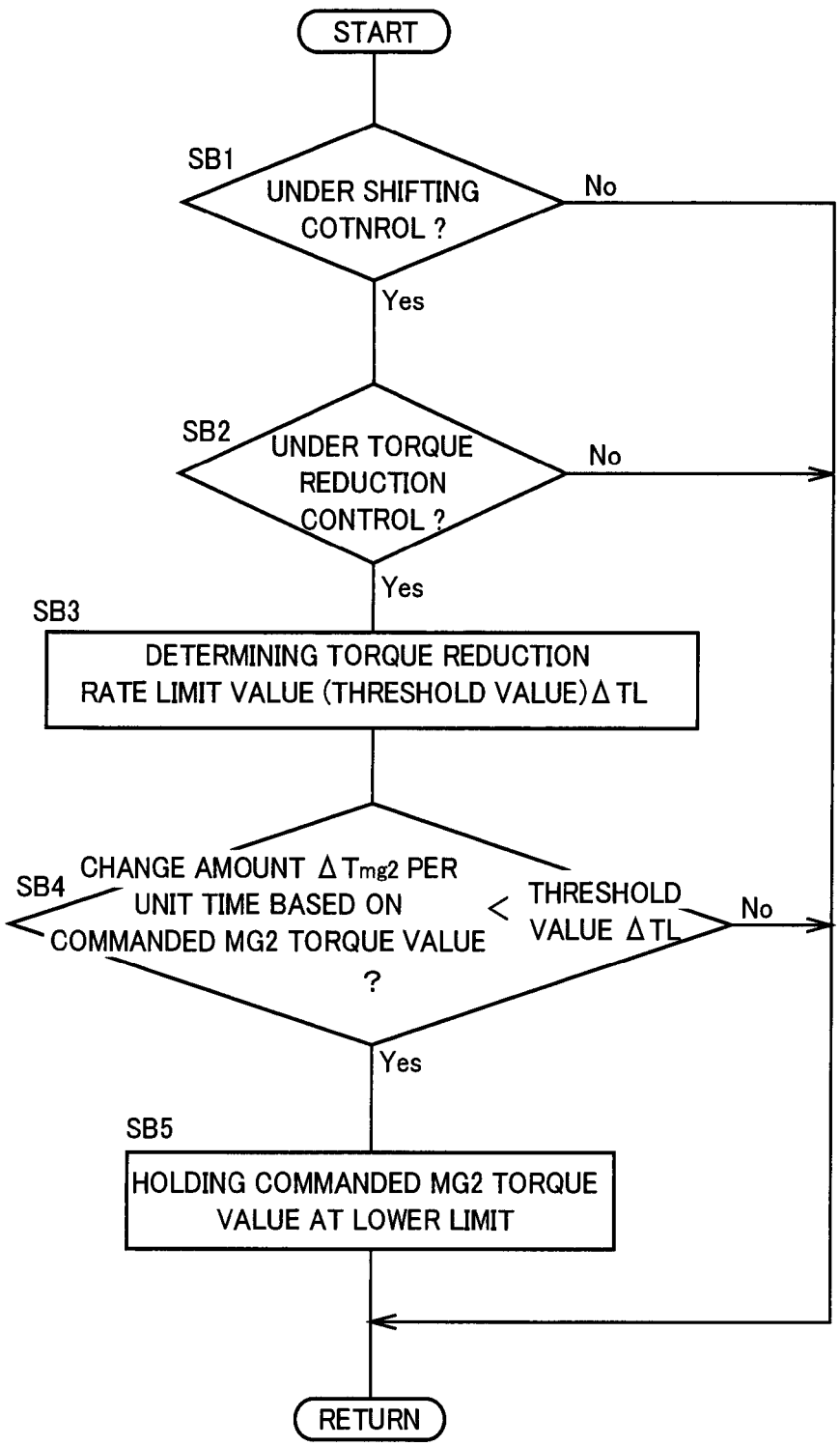
FIG. 11 is a flow chart for explaining a control operation of the major functional portions of the electronic control device of FIG. 1, namely, the control operation for preventing the voltage of the smoothing capacitor from exceeding the inverter withstanding voltage during the torque reduction control.

FIG. 11 is the flow chart for explaining a control operation of the major functional portions of the electronic control device 28, namely, the control operation for preventing the smoothing capacitor voltage Vcon from exceeding the inverter withstanding voltage Vmax during the above-indicated torque reduction control. This control operation is repeatedly executed with an extremely short cycle time of about several milliseconds to about several tens of milliseconds.

In SB1 corresponding to the shifting control means 86, a determination as to whether the automatic transmission 22 is under a shifting control is made. An affirmative determination is obtained if a shifting determination that a shifting action of the automatic transmission 22 should be performed is made on the basis of the vehicle speed VL and the accelerator operation amount Acc and according to the shifting map indicated in FIG. 5. If the affirmative determination is obtained in SB1, that is, if the automatic transmission 22 is under the shifting control, the control operation goes to SB2. If a negative determination is obtained in SB1, the present control operation is terminated.

In SB2 corresponding to the torque reduction control determining means 92, a determination as to whether the above-indicated torque reduction control is being implemented. For instance, an affirmative determination is obtained when it is determined that the torque reduction control should be implemented. If the affirmative determination is obtained, in SB2, that is, if the torque reduction control is being implemented, the control operation goes to SB3. If a negative determination is obtained in SB2, the present control operation is terminated.

In SB3, the torque reduction rate limit value $\Delta$TL is determined For example, the torque reduction rate limit value $\Delta$TL is calculated and determined by the process as illustrated in the flow chart of FIG. 9.

In SB4, a determination as to whether the second electric motor torque change rate $\Delta$Tmg2 is lower than the torque reduction rate limit value $\Delta$TL is made. Since these two values $\Delta$Tmg2 and $\Delta$TL are both negative values, the absolute values of these two values $\Delta$Tmg2 and $\Delta$TL are compared with each other to determine whether the absolute value of the second electric motor torque change rate $\Delta$Tmg2 is larger than the absolute value of the torque reduction rate limit value $\Delta$TL. The second electric motor torque change rate $\Delta$Tmg2 determined in SB2 is calculated on the basis of the torque value to be commanded for the second inverter 44 by the electric control device 28 in the next cycle and the torque value commanded in the last cycle. Thus, the second electric motor torque change rate $\Delta$Tmg2 is a value of the second electric motor torque change rate $\Delta$Tmg2 which is estimated to be realized when the torque value to be commanded in the next cycle is actually commanded. If an affirmative determination is obtained in SB4, that is, if the second electric motor torque change rate $\Delta$Tmg2 is lower than the torque reduction rate limit value $\Delta$TL, the control operation goes to SB5. If a negative determination is obtained in SB4, the present control operation is terminated.

In SB5, the torque value to be commanded in the next cycle is limited to a value at which the second electric motor torque change rate $\Delta$Tmg2 is equal to or higher the torque reduction rate limit value $\Delta$TL. Namely, the rate of reduction of the second electric motor toque Tmg2 by the above-described torque reduction limitation control is held at a predetermined lower limit For example, in SB5, the lower limit of the second electric motor torque change rate $\Delta$Tmg2 to be commanded in the next cycle is determined to be equal to the torque reduction rate limit value $\Delta$TL. It is noted that SB3 through SB5 correspond to the torque reduction limitation control means 94.

Figure 12:
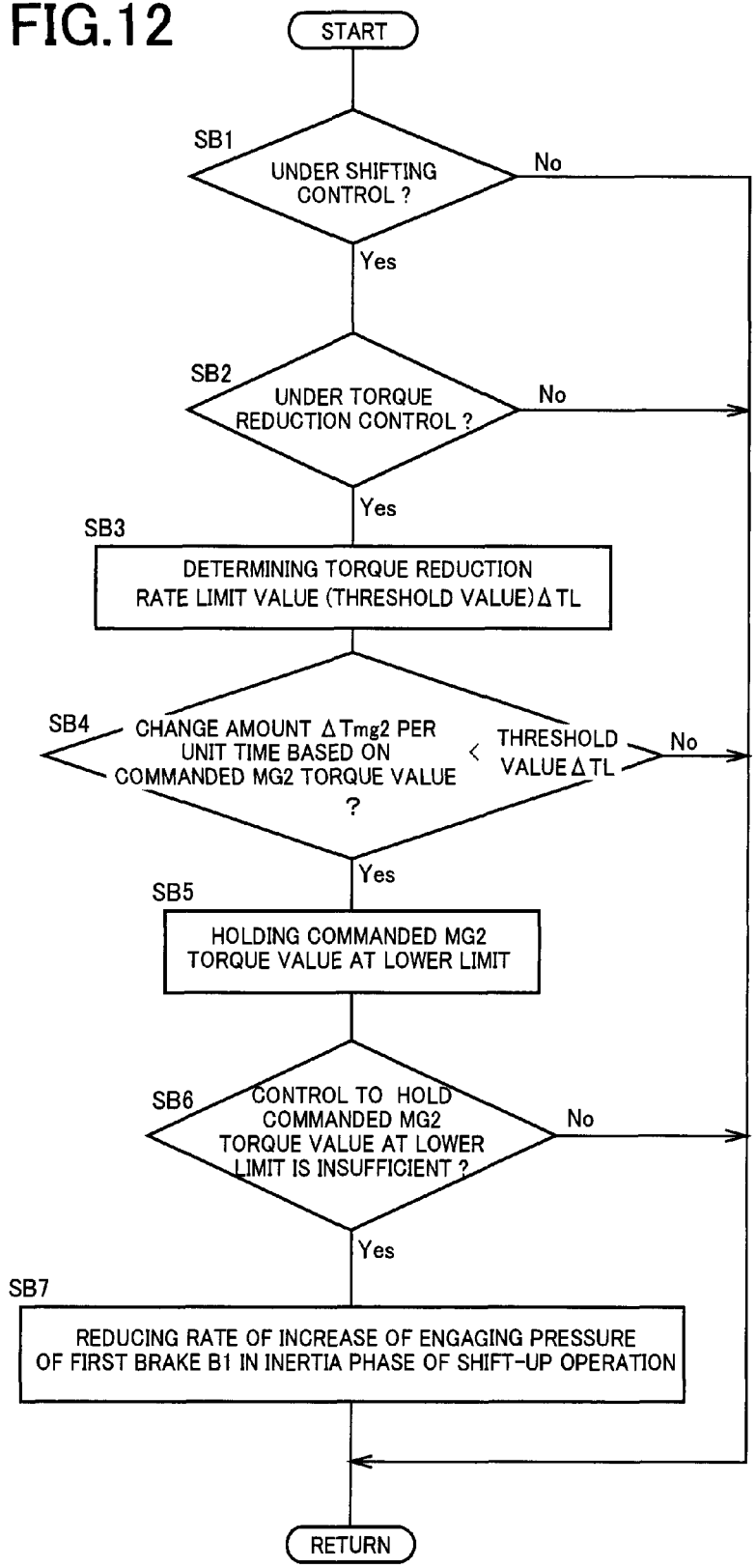
FIG. 12 is a flow chart for explaining steps corresponding to the additional control functions shown in FIG. 10 performed in addition to the control functions of the functional block diagram of FIG. 4 that are shown in the flow chart of FIG. 11.

Although the control operation according to the present embodiment is illustrated in the flow chart of FIG. 11, this control operation may be modified to implement SB6 and SB7 following SB5, as illustrated in the flow chart of FIG. 12. SB6 and SB7 in the flow chart of FIG. 12 will be described.

As shown in FIG. 12, SB6 is implemented following SB5, to determine whether the control in SB5 to hold the commanded torque value at the lower limit is insufficient to prevent the smoothing capacitor voltage Vcon in the above-described torque reduction control from exceeding the inverter withstanding voltage Vmax. If an affirmative determination is obtained in SB6, namely, if the control to hold the commanded torque value at the lower limit is insufficient, the control operation goes to SB7. If a negative determination is obtained in SB6, the control operation is terminated.

In SB7, the first brake hydraulic pressure PB1 is controlled as indicated by the two-dot chain line in the time chart of FIG. 6, to reduce the rate of rise of the engaging force of the above-indicated engaging side coupling device, that is, the first brake B1, in the inertia phase of the shift-up action of the automatic transmission 22. It is noted that SB6 corresponds to the torque reduction limitation determining means 100, while SB7 corresponds to the engaging hydraulic pressure control means 102.

In the embodiments described above, the torque reduction limitation control means 94 implements the above-described torque reduction limitation control to limit the rate of reduction the second electric motor torque Tmg2 to within the range in which the smoothing capacitor voltage Vcon which temporarily rises in relation to the reduction of the second electric motor torque Tmg2 in the above-described torque reduction control will not exceed the predetermined inverter withstanding voltage Vmax. Since the abrupt reduction of the second electric motor torque Tmg2 in the above-described torque reduction control is more or less limited, the smoothing capacitor capacity Ccon need not be designed so as to deal with unlimited abrupt reduction of the second electric motor torque Tmg2 in the above-described torque reduction control, so that the smoothing capacitor capacity Ccon can be designed to be smaller than where the abrupt reduction of the second electric motor torque Tmg2 is not limited. Namely, it is possible to reduce the size and cost of the power source control circuit 60 including the inverter smoothing capacitor 66, since the size and cost of the inverter smoothing capacitor 66 tend to be reduced with a decrease of the above-described smoothing capacitor capacity Ccon.

The illustrated embodiments are further configured such that the torque reduction limitation control means 94 implements the above-described torque reduction limitation control to limit the reduction of the second electric motor torque Tmg2 by limiting the second electric motor torque change rate ΔTmg2 during the reduction of the second electric motor torque Tmg2 in the above-described torque reduction control, to within the predetermined torque reduction rate limiting range WTL in which the smoothing capacitor voltage Vcon will not exceed the inverter withstanding voltage Vmax. Accordingly, it is possible to prevent the smoothing capacitor voltage Vcon from exceeding the inverter withstanding voltage Vmax, by monitoring the second electric motor torque Tmg2, so that the reduction of the second electric motor torque Tmg2 can be easily limited in the above-described torque reduction limitation control.

The illustrated embodiments are also configured such that the torque reduction limitation control means 94 determines from time to time the torque reduction rate limit value ΔTL, that is, the torque reduction rate limiting range WTL, on the basis of the smoothing capacitor voltage Vcon, and according to the map of FIG. 8, for example. Accordingly, the degree of limitation of the abrupt reduction of the second electric motor torque Tmg2 is changed according to the smoothing capacitor voltage Vcon which changes with a lapse of time, so that the above-described torque reduction control ensures a high degree of vehicle drivability according to the above-indicated smoothing capacitor voltage Vcon.

The illustrated embodiments are further configured such that the torque reduction limitation control means 94 determines from time to time the torque reduction rate limit value ΔTL, that is, the torque reduction rate limiting range WTL, on the basis of the output change amount ΔPnm of the second electric motor MG2 per unit time (second electric motor speed output change rate ΔPnm) due to a change of the speed Nmg2, the second electric motor speed Nmg2, and the smoothing capacitor voltage Vcon, as illustrated in the flow chart of FIG. 9, for example. Accordingly, the vehicle drivability can be further improved, since a change of the second electric motor output Pmg2 due to a change of the second electric motor speed Nmg2 is also taken into account.

In the illustrated embodiments, the above-described torque reduction rate limiting range WTL may be a predetermined fixed range, for instance. In this case, the torque reduction rate limiting range WTL need not be determined from time to time, so that the torque reduction limitation control can be easily implemented.

The illustrated embodiments are also configured such that the rate of rise of the engaging force of the above-described engaging side coupling device (first brake BD is reduced when the above-described torque reduction limitation control is insufficient to prevent the smoothing capacitor voltage Vcon from exceeding the inverter withstanding voltage Vmax, with respect to the rate of rise of the engaging force when the torque reduction limitation control is sufficient, for example. Accordingly, the rate of reduction of the second electric motor output Pmg2 due to reduction of the second electric motor speed Nmg2 is reduced by reducing the rate of rise of the engaging force of the engaging side coupling device, making it possible to prevent abrupt reduction of the second electric motor output Pmg2 caused by the reduction of the second electric motor speed Nmg2, thereby making it possible to more stably prevent the smoothing capacitor voltage Vcon from exceeding the inverter withstanding voltage Vmax.

While the embodiments of this invention have been described in detail by reference to the drawings, for illustrative purpose only, it is to be understood that the invention may be embodied with various changes and improvements, which may occur to those skilled in the art.

Although the automatic transmission 22 in the illustrated embodiments has the two operating positions, the automatic transmission 22 does not necessarily have the two operating positions, and may be modified to have three or more operating positions.

In the illustrated embodiments described above, the control operation illustrated in the flow charts of FIGS. 11 and 12 includes the steps SB1 and SB2. While the control operation preferably includes the steps SB1 and SB2, these steps are not essential, and may be eliminated. In this case, the control operation is initiated with the step SB3.

In the illustrated embodiments described above, the vehicular power transmitting system 10 is provided with the planetary gear set 26 and the first electric motor MG1. However, the vehicular power transmitting system need not be provided with the first electric motor MG1 and the planetary gear set 26, and may be modified to be used on a so-called parallel hybrid vehicle in which the engine 24, clutch, second electric motor MG2, automatic transmission 22 and drive wheels 18 are connected in series. It is noted that the above-indicated clutch is provided as needed between the engine 24 and the second electric motor MG2, and that the above-described parallel hybrid vehicle may not be provided with the clutch.

Although the vehicular power transmitting system 10 in the illustrated embodiments is used on a hybrid vehicle, the present invention is applicable to a vehicular power transmitting system for an electric vehicle, which is not provided with the engine 24, planetary gear set 26 and first electric motor MG1 and in which the second electric motor MG2 provided as the vehicle drive power source, the automatic transmission 22 and the drive wheels 18 are connected in series.

In the illustrated embodiments, the vehicle speed VL is used as the variable taken along the horizontal axis of the shifting map of FIG. 5. However, the vehicle speed VL in the shifting map of FIG. 5 may be replaced by the output shaft speed Nout, since the vehicle speed VL is proportional to the output shaft speed Nout.

It is to be understood that the present invention may be embodied with various other changes not illustrated therein, without departing from the spirit of the invention.

NOMENCLATURE OF REFERENCE SIGNS

10: Vehicular power transmitting system
18: Drive wheels
22: Automatic transmission
28: Electronic control device (Control apparatus)
32: Electric-energy storage device (Electric motor power source)
44: Second inverter (Inverter)
66: Inverter smoothing capacitor
B1: First brake (Coupling device)
B2: Second brake (Coupling device)
MG2: Second electric motor (Electric motor)

The invention claimed is:

1. A control apparatus for a vehicle provided with an electric motor power source, an inverter, an electric motor connected through said inverter to said electric motor power source, an inverter smoothing capacitor connected to a terminal of said inverter on the side of said electric motor power source to smooth a voltage input from said electric motor power source to the inverter, and a step-variable automatic transmission constituting a part of a power transmitting path between said electric motor and a drive wheel, said control apparatus comprising a torque reduction control portion configured to implement a torque reduction control to temporarily reduce an output torque of said electric motor during a shifting action of said automatic transmission, with respect to an output torque of the electric motor before initiation of the shifting action, said control apparatus further comprising:

a torque reduction limitation control portion configured to implement a torque reduction limitation control to limit reduction of the output torque of said electric motor to within a range in which a terminal voltage of said inverter smoothing capacitor which rises in relation to reduction of the output torque of said electric motor in said torque reduction control will not exceed a predetermined withstanding voltage of said inverter, said torque reduction limitation control portion implements said torque reduction limitation control to limit the reduction of the output torque of said electric motor by limiting an amount of change of the output torque of said electric motor per unit time during the reduction of the output torque of said electric motor in said torque reduction control, to within a predetermined torque reduction rate limiting range in which the terminal voltage of said inverter smoothing capacitor will not exceed said predetermined withstanding voltage, wherein said torque reduction rate limiting range is determined upon initiation of the shifting action of the automatic transmission.

wherein said automatic transmission is shifted by a releasing action of a releasing side coupling device and an engaging action of an engaging side coupling device.

and wherein said shifting action of said automatic transmission during which said torque reduction control is implemented is a shift-up action, said control apparatus further comprising an engaging force limiting portion configured to reduce a rate of rise of an engaging force of said engaging side coupling device when said torque reduction limitation control is insufficient to prevent the terminal voltage of said inverter smoothinq capacitor from exceeding said withstanding voltage, with respect to a rate of rise of the engaging force when the torque reduction limitation control is sufficient.

2. The control apparatus according to claim 1, wherein said torque reduction limitation control portion determines and updates said torque reduction rate limiting range from time to time on the basis of the terminal voltage of said inverter smoothing capacitor.

3. The control apparatus according to claim 2, wherein said torque reduction limitation control portion determines and updates said torque reduction rate limiting range from time to time on the basis of an amount of change of an output of said electric motor per unit time due to a change of a speed of the electric motor, and the speed of said electric motor.

* * * * *